US012453674B2

(12) United States Patent
Islava

(10) Patent No.: US 12,453,674 B2
(45) Date of Patent: Oct. 28, 2025

(54) AIRWAY BRIDGE AND METHOD FOR USING THE SAME

(71) Applicant: Steve Islava, Newport Beach, CA (US)

(72) Inventor: Steve Islava, Newport Beach, CA (US)

( * ) Notice: Subject to any disclaimer, the term of this patent is extended or adjusted under 35 U.S.C. 154(b) by 390 days.

(21) Appl. No.: 15/925,196

(22) Filed: Mar. 19, 2018

(65) Prior Publication Data

US 2019/0231642 A1 Aug. 1, 2019

Related U.S. Application Data

(63) Continuation-in-part of application No. 15/884,051, filed on Jan. 30, 2018.

(51) Int. Cl.

| | |
|---|---|
| ***A61F 2/82*** | (2013.01) |
| ***A61G 13/12*** | (2006.01) |
| ***A61H 31/00*** | (2006.01) |

(52) U.S. Cl.

CPC ....... *A61H 31/008* (2013.01); *A61G 13/1215* (2013.01); *A61H 31/004* (2013.01); *A61H 2201/0192* (2013.01)

(58) Field of Classification Search

CPC .. A61G 13/1215; A61G 13/08; A61G 12/102; A61G 7/07; A61G 7/072; A61G 13/121; A61G 15/12; A61G 15/125; A61H 31/004; A61H 31/007; A61H 37/00; A61H 2201/0134; A61H 2201/0146; A61H 2201/0161; A61H 2201/0173; A61H 2201/1607; A61H 2201/1611; A61H 2201/0192; A61H 2203/0468; A61H 2205/04; A61H 2205/02; A61H 2205/081; A61F 5/56; A47G 9/1081; A47G 9/1082; A47G 9/109; A63B 23/025; A63B 2023/006; A63B 23/0233; A63B 23/0238

See application file for complete search history.

(56) References Cited

U.S. PATENT DOCUMENTS 306,590 A * 10/1884 Davis
309,678 A * 12/1884 Aubin

* cited by examiner

*Primary Examiner* — Rachael E Bredefeld
*Assistant Examiner* — Camtu T Nguyen
(74) *Attorney, Agent, or Firm* — MH2 Technology Law Group

(57) ABSTRACT

A device and method for performing cardiopulmonary resuscitation (CPR) on a patient. The device is an extendable airway bridge which is initially in a collapsed or storage configuration. Upon use, the airway bridge is unfolded and then fixed into an operating configuration by locking at least one incline portion and at least one vertical portion into a static position. The structural strength of the airway bridge is then increased by manipulating a support disposed on the incline portion so that it is engaged with a slot or aperture defined within a base of the airway bridge. Once in the operating configuration, the patient is laid onto the airway bridge which holds the patient in a position so as to prevent occlusion of the patient's oral airway. CPR may then be performed on the patient.

7 Claims, 22 Drawing Sheets

AIRWAY BRIDGE AND METHOD FOR USING THE SAME

BACKGROUND

Field of the Technology

The invention relates to the field of cardiopulmonary resuscitation (CPR), specifically to apparatuses and methods for quickly stabilizing the head and neck of a patient for improved performance of cardiopulmonary resuscitation (CPR).

Description of the Prior Art

Cardiopulmonary resuscitation or CPR has long been used to reinstate or preserve blood flow through a patient until further medical treatment arrives or can be implemented. CPR principally comprises a series of chest compressions delivered by hand followed by a volume of air being forced into the patient's airway through mouth to mouth resuscitation or through a one-way valve disposed in a mask that is placed on the patient. Compressing the patient's chest raises the patient's blood pressure so that organs such as the brain continue to receive blood flow while air forced into the patient's lungs forces them to respire for an extended amount of time over what would have occurred had no assistance been given. When CPR was first implemented as a treatment regimen, the initial proscribed method included ventilating the patient once for every five chest compressions. This was later changed to ventilate the patient twice for every ten chest compressions. Modernly however, the preferred CPR treatment regime includes two ventilations for every thirty chest compressions.

Regardless of the ratio of chest compressions to ventilations however, in order for CPR to be truly effective, the oral airway of the patient must remain accessible and free of occlusions. This can be particularly difficult when the patient is severely injured or when the patient's tongue is otherwise blocking or occluding the patient's oral airway thus preventing effective patient ventilation. This can be especially critical in emergency situations when every moment that the patient is denied blood flow or oxygen dramatically increases the odds of stroke or even death. Previous airway bridges that have been used include molds which are used to prop the patient's shoulders and neck in an upward position. With the airway bridge properly placed, the patient's head is tilted backward, thus clearing the patient's oral airway for proper ventilation. These airway bridges are typically comprised of foam and are vacuum packed and sealed within the EMT's medical equipment in order to save space. Frequently however during transit to the accident site, these vacuum packed airway bridges can have their seal broken or removed, thus causing the foam of the airway bridge to prematurely expand within its packaging. Thus when the EMT retrieves the airway bridge for use on a patient, the airway bridge can be difficult to remove from its packaging, thus delaying treatment of the patient even further.

What is needed therefore is an apparatus and method for quickly and efficiently supporting and clearing a patient's airway for CPR treatment or other treatments requiring access to the patient's oral airway while the patient is still present at the scene of the emergency. The apparatus should be easily transported and stored while also being inexpensive, disposable, and easy to use.

BRIEF SUMMARY

The current invention is an airway bridge for maintaining a patient at an elevated position. The airway bridge includes a base, a head rest connected to the base, and an adjustable first vertical portion connected to the head rest. The airway bridge further includes an adjustable first incline portion which is in turn connected to the first vertical portion and an adjustable support that is disposed on the first incline portion. Additionally, the airway bridge includes a slot that is defined within one of its upward facing surfaces. Here, the adjustable support is configured to be selectively engaged with the slot defined within the upward facing surface of the airway bridge.

In one embodiment, the airway bridge further includes an adjustable second incline portion connected to the base, an adjustable second vertical portion connected to the second incline portion, and a tab which is disposed on a lateral edge of the second vertical portion. In this embodiment, the support is defined within the first incline portion while the second incline portion includes a finger aperture defined through its surface. Additionally, the first vertical portion of the airway bridge includes a tab aperture which is configured to accommodate the tab disposed on the edge of the second vertical portion.

In another embodiment, the slot defined within an upward facing surface of the airway bridge is specifically defined within an upward facing surface of the base.

In a related embodiment, the airway bridge also includes an incline aperture defined within the base, wherein the incline aperture is specifically configured to accommodate a distal end of the first incline portion.

In yet another embodiment, the support of the airway bridge has a tapered tip and the slot defined within the upward facing surface of the base is specifically configured to accommodate the tapered tip of the support.

The current invention also provides an alternative airway bridge for maintaining a patient at an elevated position. The airway bridge includes a base, a head rest connected to the base, and an adjustable incline portion connected to the base. An adjustable vertical portion is then in turn connected to the incline portion. The airway bridge also includes a tab aperture which is defined within a surface of the head rest.

In one embodiment, the airway bridge also includes a tab disposed on a lateral edge of the vertical portion, wherein the tab aperture is specifically configured to accommodate the tab disposed on the lateral edge of the vertical portion.

The current invention is also a method for using an airway bridge. The method includes manipulating a first incline portion of the airway bridge to be disposed at an angle relative to a base of the airway bridge, manipulating a first vertical portion of the airway bridge to be disposed at an angle relative to the base and the first incline portion, and then locking the first incline portion and the first vertical portion into a stationary position. After the airway bridge has been assembled, the patient is placed onto the airway bridge where cardio pulmonary resuscitation (CPR) may be performed on the patient.

In one embodiment, the method also includes manipulating a second incline portion coupled to the base by layering it over the first incline portion. Next, a second vertical portion connected to the second incline portion is then manipulated by layering it over the first vertical portion. The first incline portion and the first vertical portion are then locked into position by inserting a tab disposed on an edge of the second vertical portion into a tab aperture defined within the first vertical portion.

In another embodiment, manipulating the second incline portion connected to the base by layering it over the first incline portion specifically involves aligning a finger aperture defined in the second incline portion over an adjustable support disposed within the first incline portion. In this embodiment, locking the first incline portion and the first vertical portion into position is accomplished by manipulating the support disposed within the first incline portion through the finger aperture defined in the second incline portion. In a related embodiment, locking the first incline portion and the first vertical portion into position may be accomplished by inserting the support disposed within the first incline portion into a slot defined within the base.

In a separate embodiment, the method step of locking the first incline portion and the first vertical portion into position is done by inserting a tab disposed on an edge of the first vertical portion into a tab aperture defined within a head rest coupled to the base.

In yet another embodiment, the method step of locking the first incline portion and the first vertical portion into position is done by inserting a distal end of the first incline portion into an incline aperture defined within the base of the airway bridge. Next, a tapered tip of a support connected to the first incline portion is inserted into a support aperture defined within the base of the airway bridge.

In another embodiment, the method step of placing the patient onto the airway bridge specifically includes placing the shoulders of the patient on the first incline portion while placing the head of the patient on a head rest of the airway bridge, the first incline portion and the head rest being disposed at different heights relative to one another.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

Figure 1:
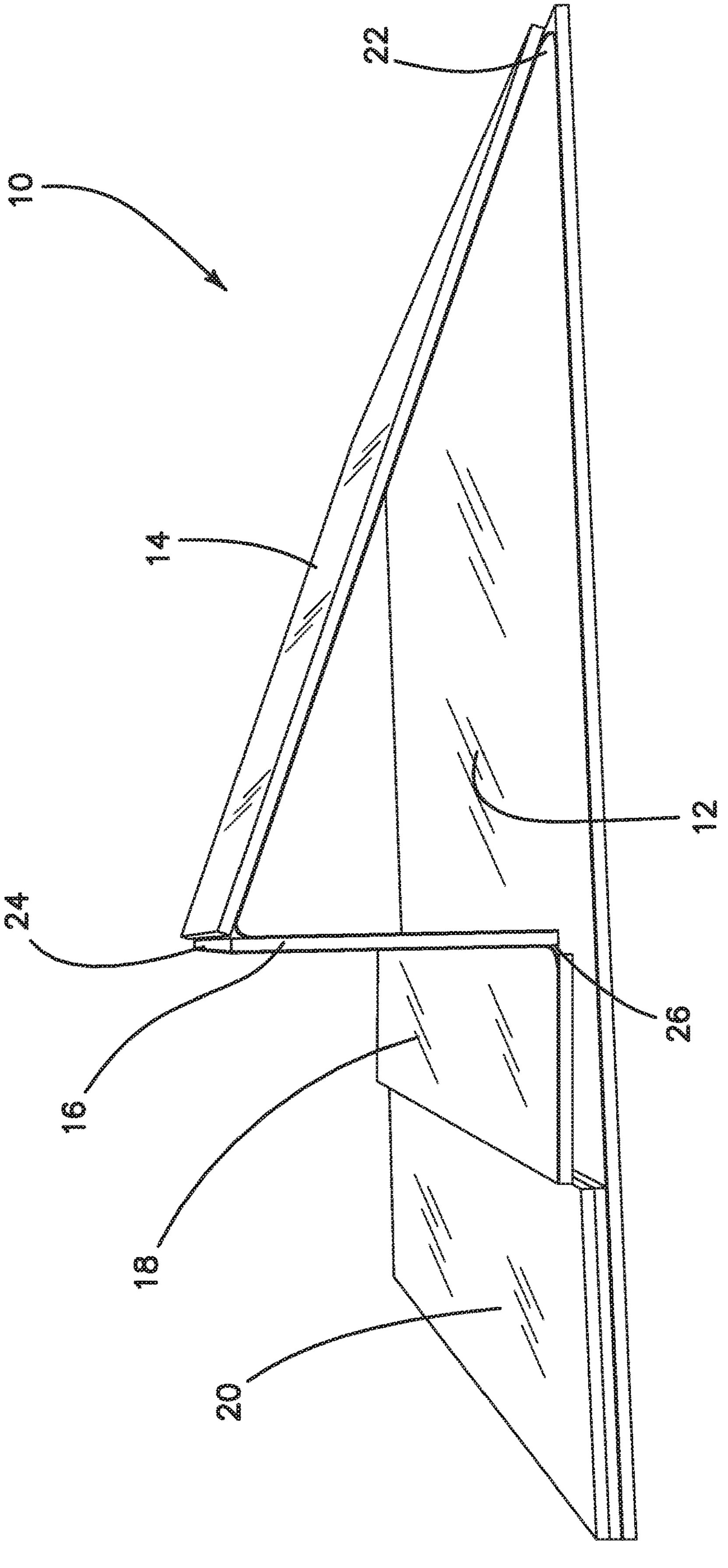
FIG. 1 is a side view of the current airway bridge when it has been assembled into an operating configuration.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The current invention is an adjustable and collapsible rigid airway bridge which is seen in FIGS. 1-9 and is generally denoted by reference numeral 10. In FIGS. 1, 4, 6, and 8, the airway bridge 10 is seen in a fully actuated or operating position, namely a configuration which is configured to receive a patient. In one embodiment, the airway bridge 10 comprises a base portion 12 and an incline portion 14 coupled together via a first joint 22 at a proximal edge of the incline portion 14. Coupled to the opposing distal edge of the incline portion 14 at a second joint 24 is a vertical portion 16. In turn, at the opposing edge of the vertical portion 16 is a third joint 26 coupled to a brace portion 18.

Figure 4:
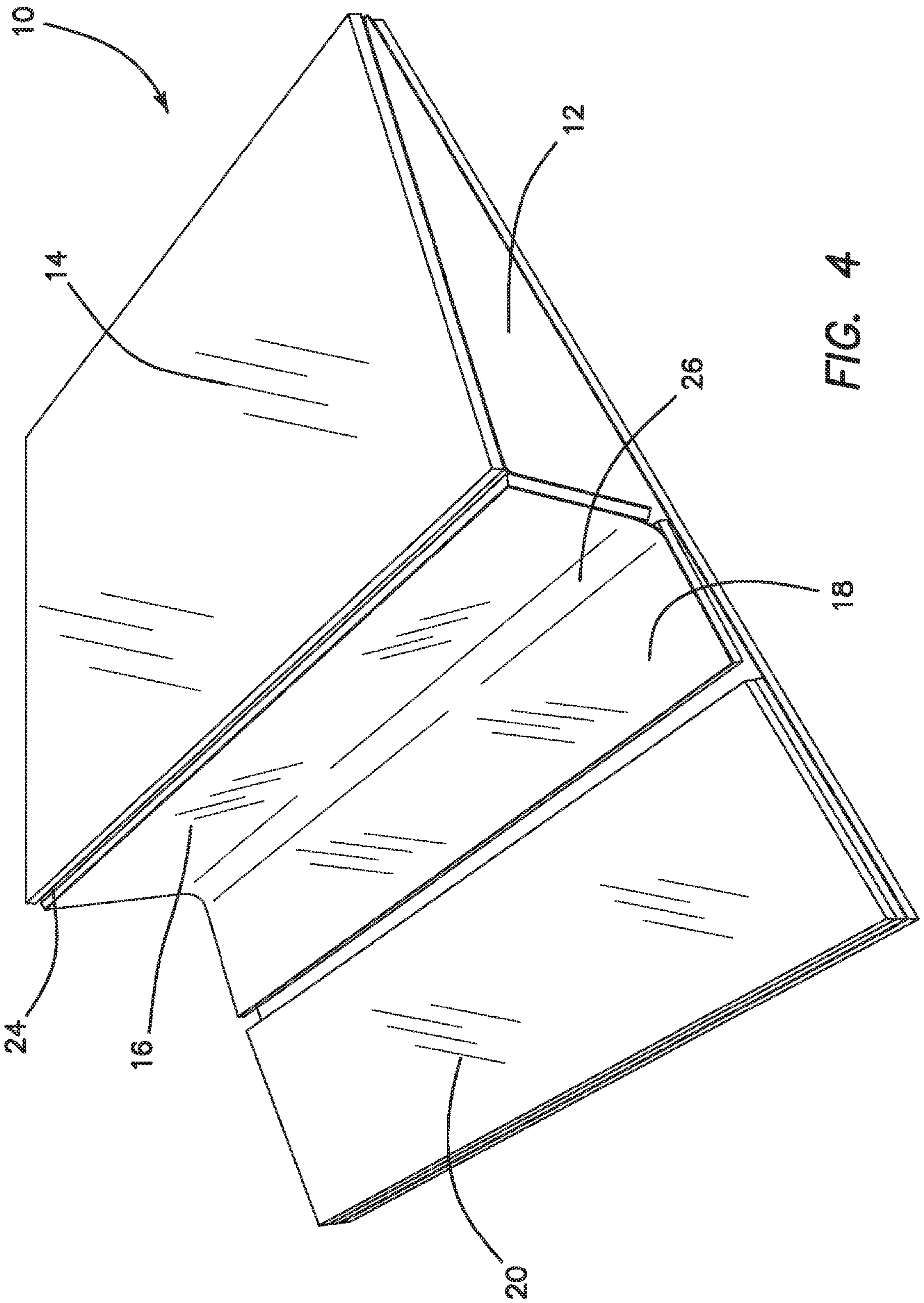
FIG. 4 is a perspective view of the airway bridge while in the operating configuration seen in FIG. 1.

Additionally coupled to the base 12 is at least one stop 20, preferably disposed at the very edge of one end of the base 12 as best seen in FIGS. 1 and 4. The surface elements of the airway bridge 10, namely the base 12, the incline 14, the vertical portion 16, the brace 18, and the stop 20 are preferably comprised of a substantially rigid yet lightweight material such as plastic, cardboard, aluminum, or wood, however other similar materials now known or later devised may be used without departing from the original spirit and scope of the invention. The joints 22, 24, 26 in turn are preferably comprised of a flexible yet durable material such as nylon, leather, plastic composites, or other similar materials.

In one particular embodiment, each surface element of the airway bridge 10 including the base 12, incline 14, vertical portion 16, brace 18, and stop 20 each comprise a graphic or image disposed across its respective surface. For example, the incline 14 may contain a graphic which comprises an image or a series of images depicting how to use the airway bridge 10 on a patient or how to perform CPR. The brace 18 and stop 20 may further comprise an image which shows where the user is to place the head of the patient as the patient is being lowered onto the airway bridge 10. The image disposed across the brace 18 and the stop 20 can cooperate and form a larger image which, when the brace 18 is adhered to the base 12, ensures that the brace 18 is properly aligned with the stop 20.

Figure 2:
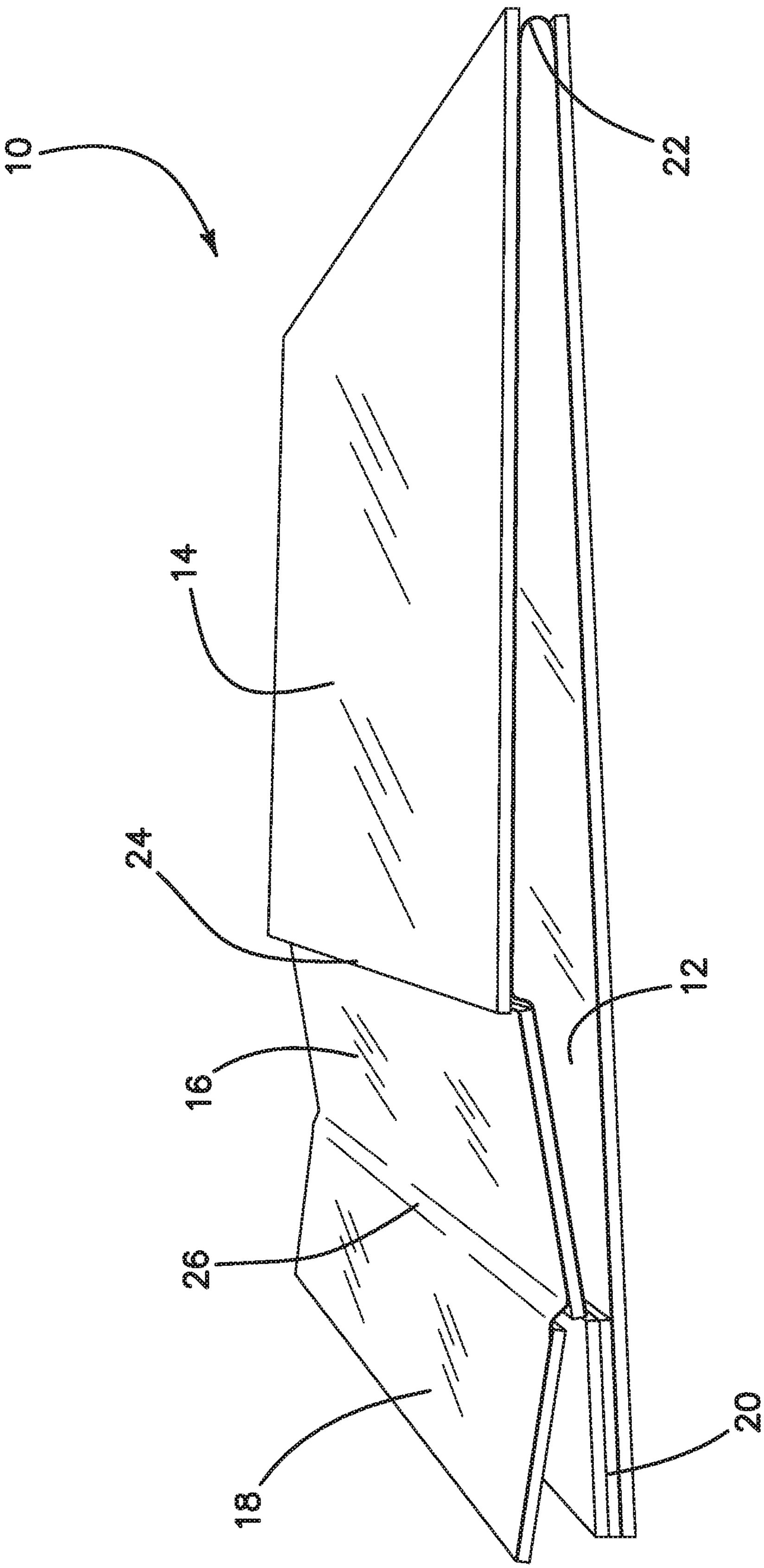
FIG. 2 is a side view of the airway bridge seen in FIG. 1 when it is in a storage configuration.
Figure 3:
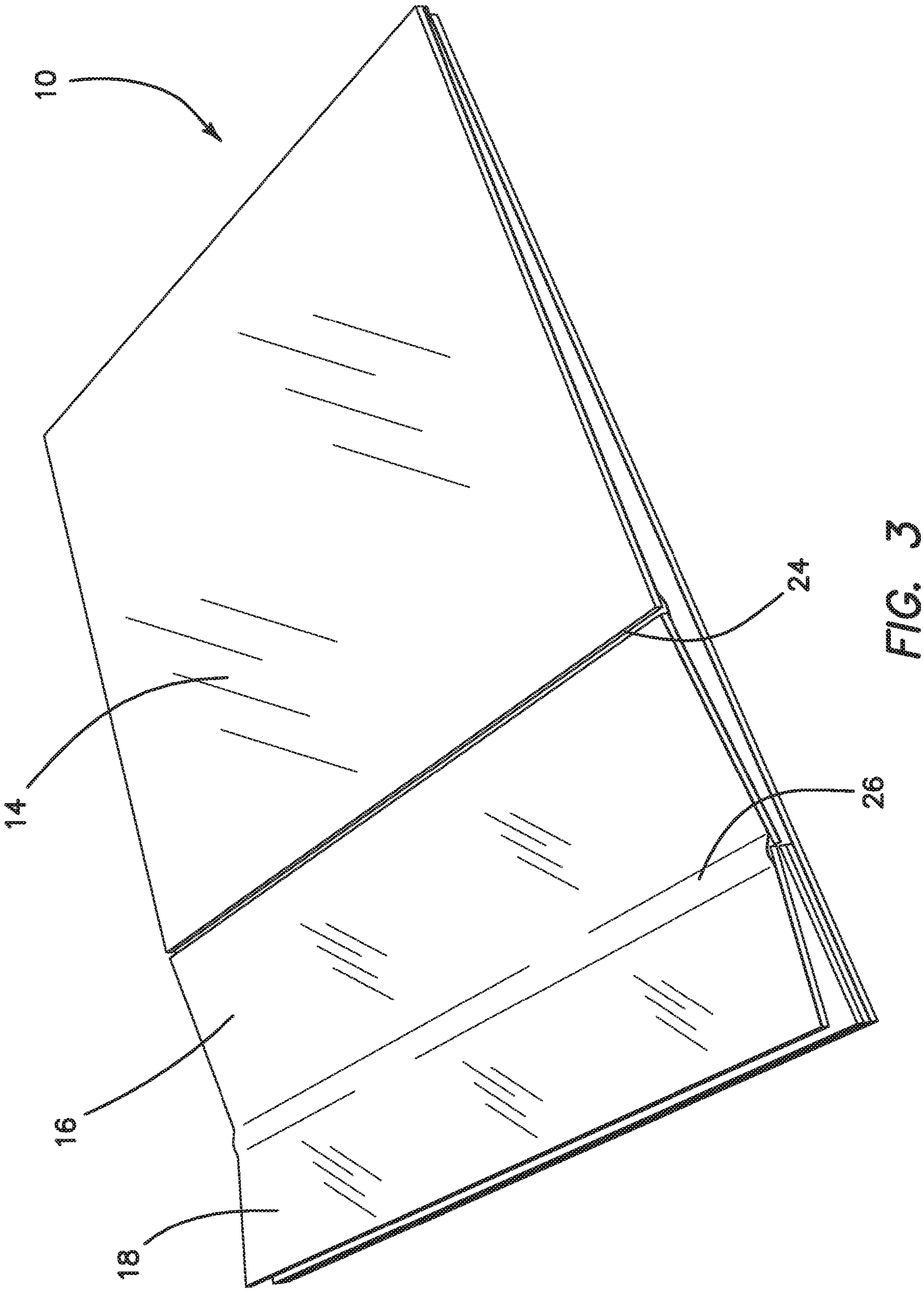
FIG. 3 is a perspective view of the airway bridge while in the storage configuration seen in FIG. 2.

In FIGS. 2 and 3, the airway bridge 10 is seen in a collapsed or storage configuration wherein the airway bridge 10 is substantially flat and/or rectangular in shape that is ideal for storage or mobile transport. As seen in FIGS. 2 and 3, the incline portion 14, vertical portion 16, and brace 18 are laid flat against the base 12 and stop 20 by bending the first joint 22 a maximum amount so that incline portion 14, vertical portion 16, and brace 18 rest against the base 12 and stop 20, respectively. With the airway bridge 10 in this configuration, the airway bridge 10 has a minimum thickness which allows a plurality of airway bridges 10 to be stacked on one another or placed into a medical equipment bag or storage case while still maintaining a minimum volume.

Figure 5:
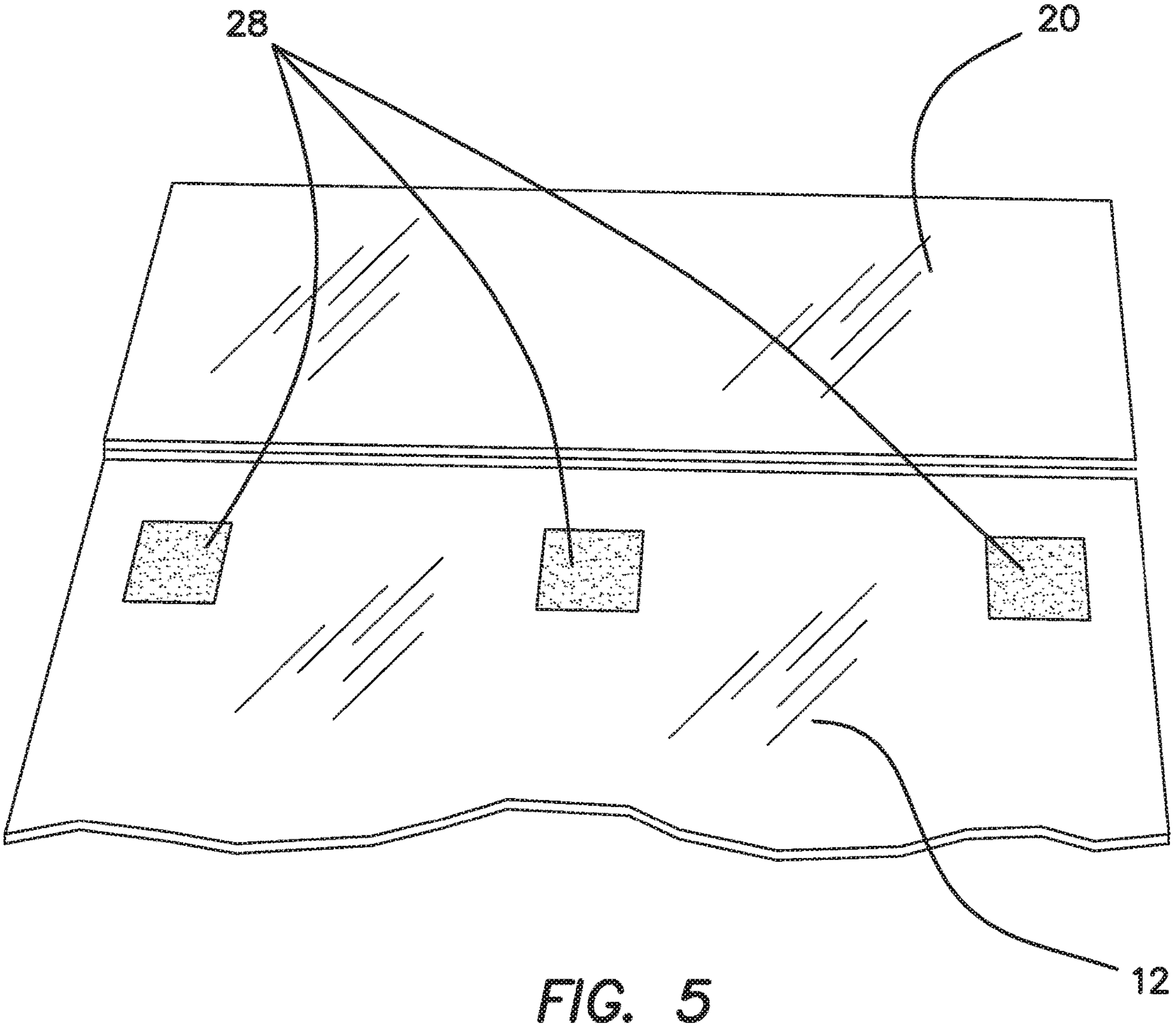
FIG. 5 is a magnified top down view of a first set of adhering means of the airway bridge.
Figure 6:
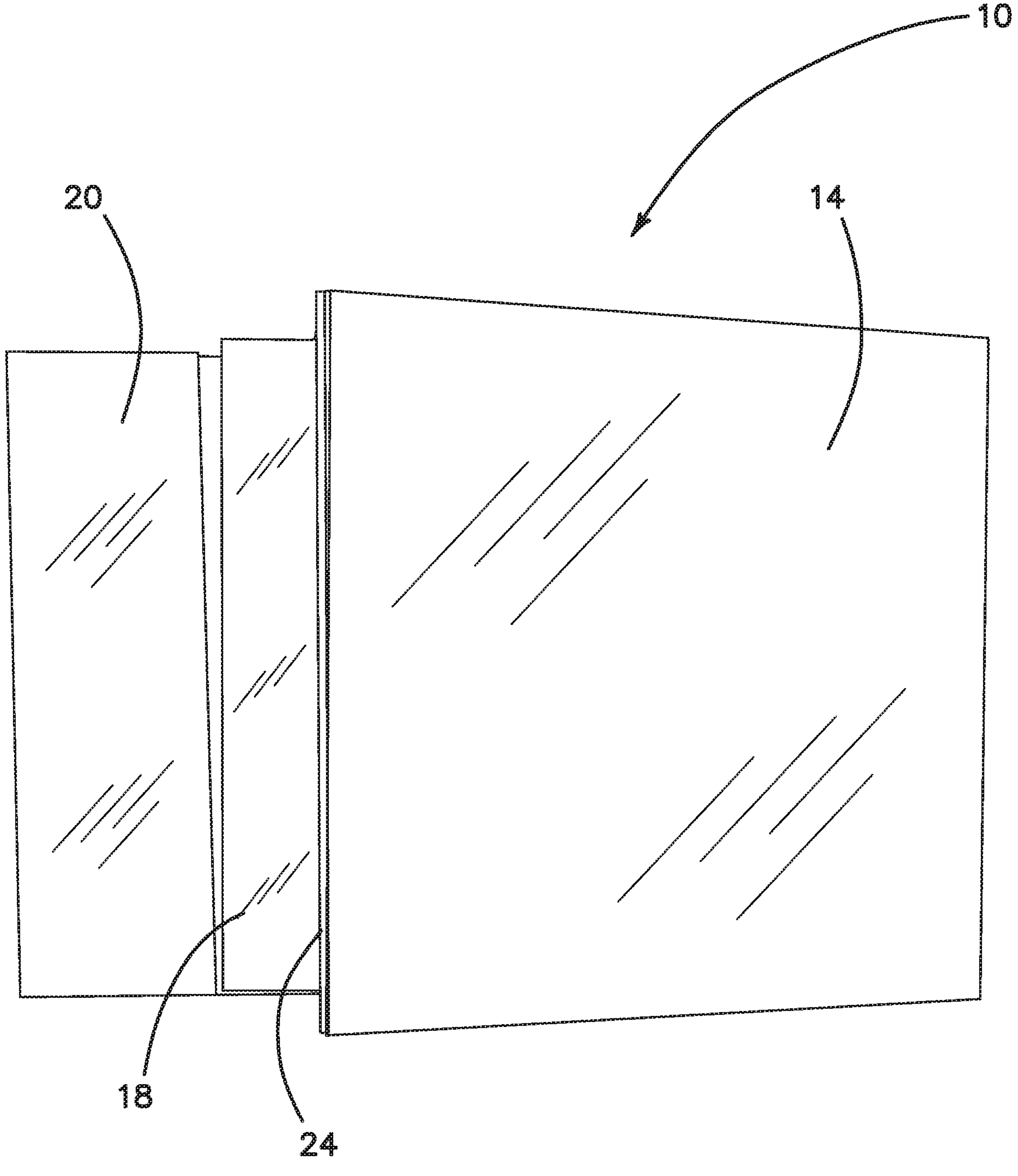
FIG. 6 is a top down view of the airway bridge while in the operating configuration seen in FIG. 1.
Figure 7:
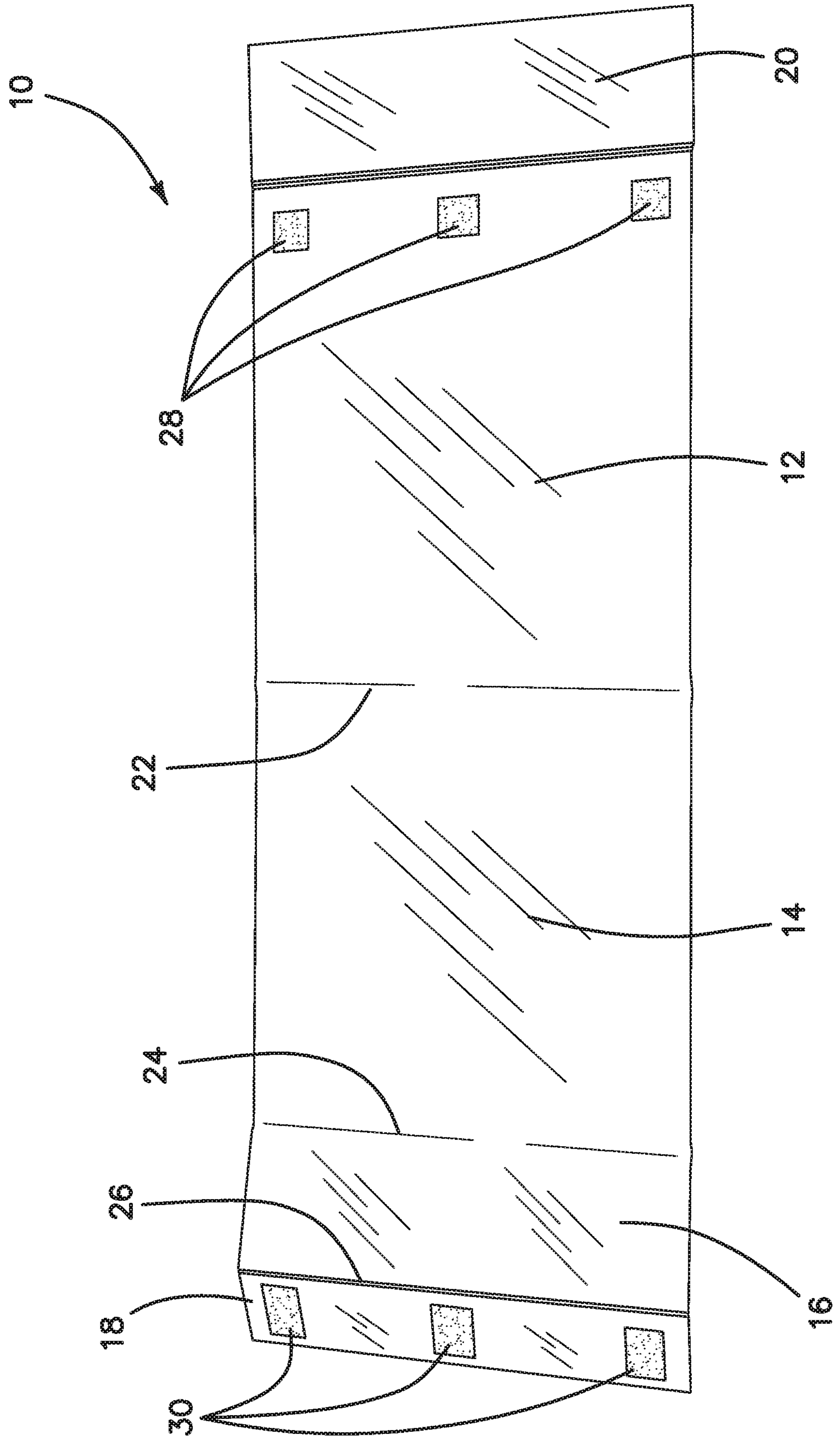
FIG. 7 is a top down view of the airway bridge while in an expanded configuration.

In FIGS. 5 and 7, the airway bridge 10 is seen in an unfolded or expanded configuration wherein the airway bridge 10 is substantially flat but in an elongated or extended shape as compared to the shape seen in FIGS. 2 and 3. As seen in FIGS. 5 and 7, the airway bridge 10 is principally a single structural body or component divided by a plurality of joints or flexible portions there between. In FIG. 7 the first joint 22 is bent to a minimum so that the incline portion 14, vertical portion 16, and brace 18 lay flat on the same plane as the base 12. Also seen in FIGS. 5 and 7 are the first adhering means 28 and the second adhering means 30. The first adhering means 28 are coupled to an upward facing surface of the base 12, while the second adhering means 30 are coupled to a downward facing surface of the brace 18. As seen in FIGS. 5 and 7, the first adhering means 28 and second adhering means 30 are corresponding portions or sections of hook and loop fabric. However the first and second adhering means 28, 30 may be any means for temporarily coupling the downward facing surface of the brace 18 to the upward facing surface of the base 12 including but not limited to hook and latch fabric, snap buttons, adhesive or glue, magnets, or the like. In FIG. 5 specifically, the first adhering means 28 is shown as being three distinct elements disposed uniformly across the width of the base 12, however it is to be expressly understood that fewer or additional elements may be disposed across the base 12 in configurations not explicitly shown without departing from the original spirit and scope of the invention.

Figure 8:
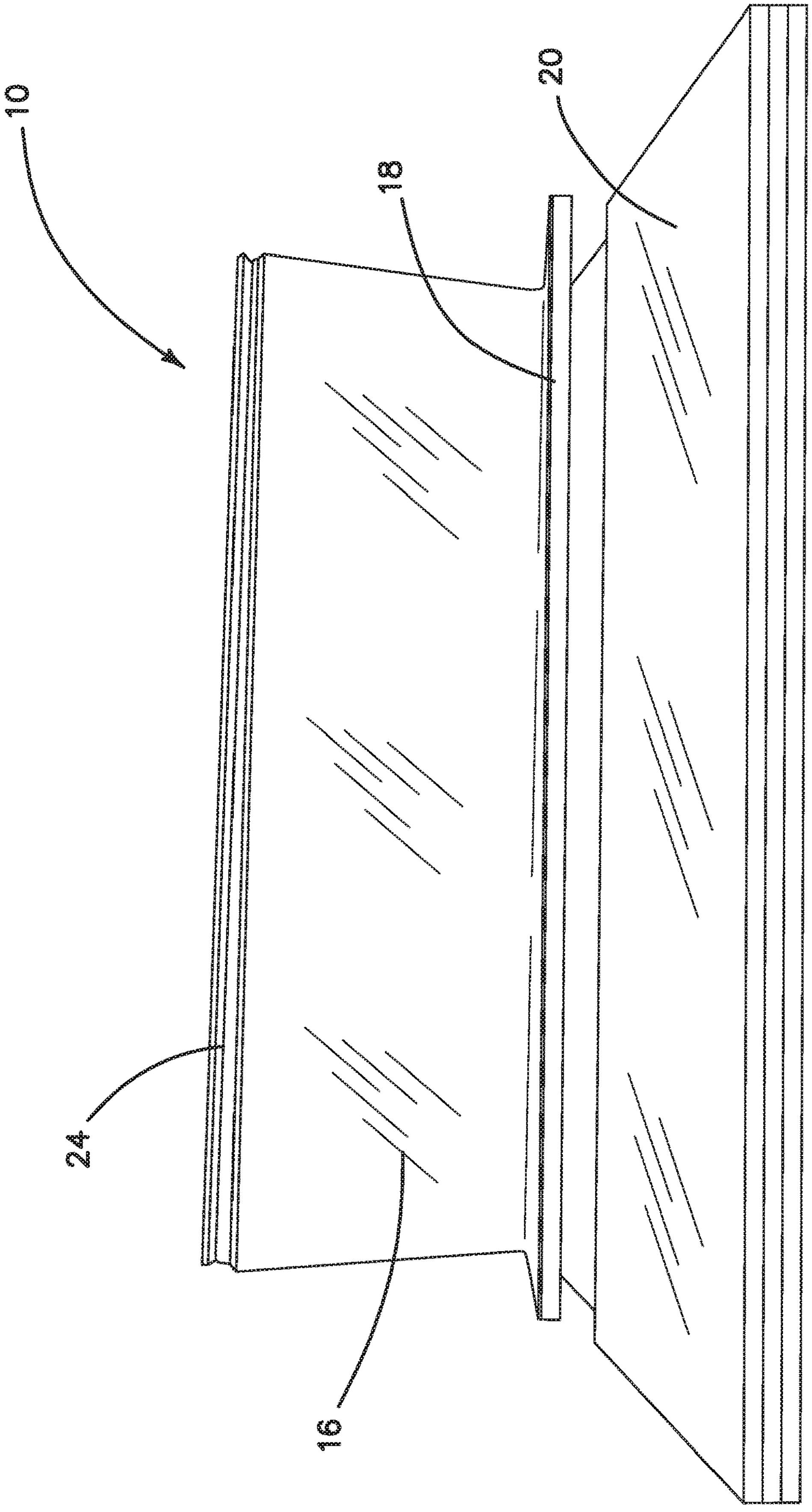
FIG. 8 is a frontal view of the airway bridge while in the operating configuration seen in FIG. 1.
Figure 9:
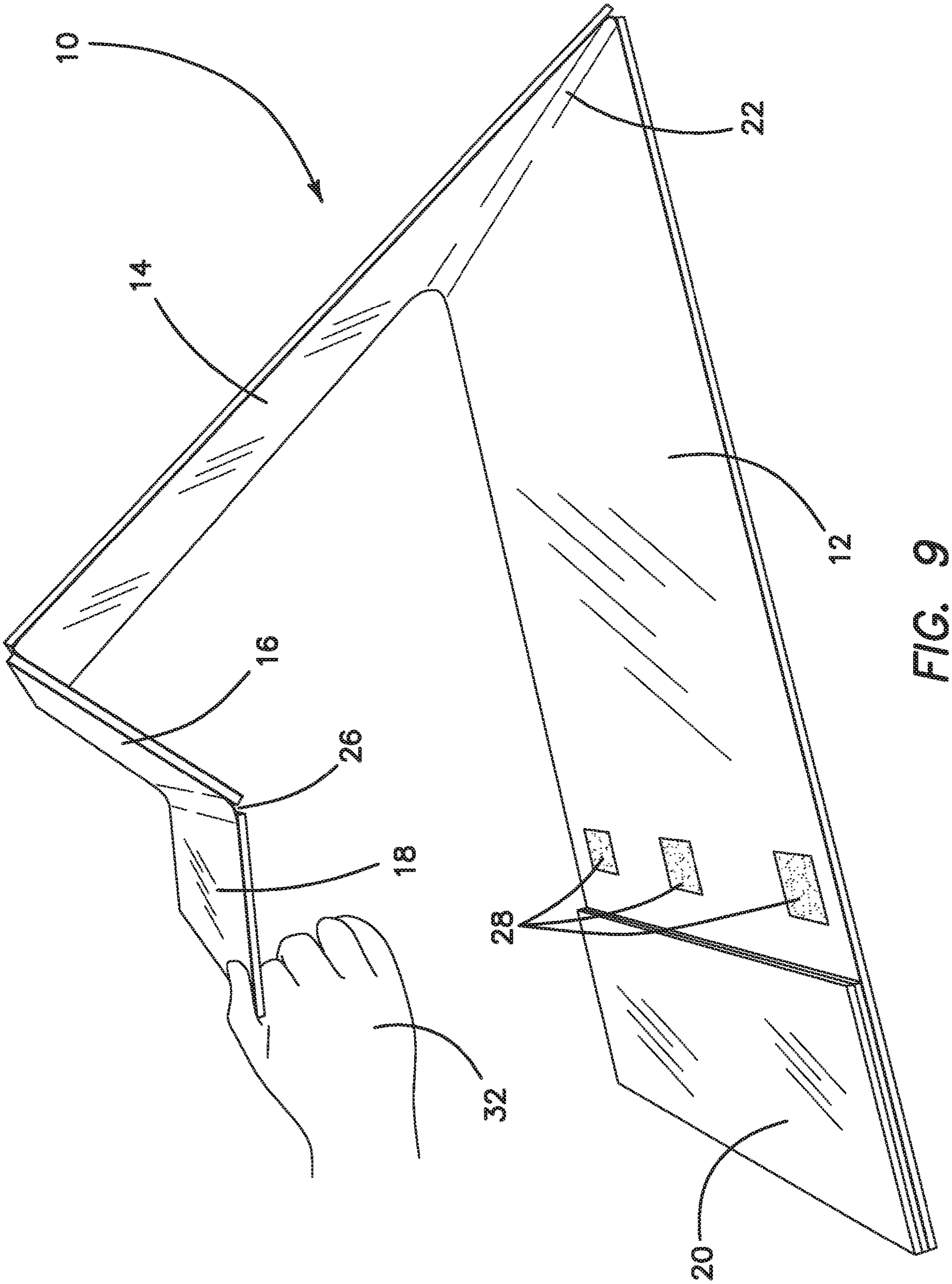
FIG. 9 is a side view of the airway bridge as it is being assembled into the operating configuration seen in FIG. 1.

To use the airway bridge 10, a user removes the airway bridge 10 from its storage location while it is in its folded configuration seen in FIGS. 2 and 3. The user 32 then places the airway bridge 10 on a flat surface. Next the user 32 lifts the incline portion 14 by gripping the brace 18 and lifting upwards, bending the airway bridge 10 at the first joint 22. The user 32 then further manipulates the airway bridge 10 by bending the airway bridge 10 at the second joint 24 and third joint 26 as best seen in FIG. 8. The user 32 then guides the brace portion 18 down against the base 12 so that the distal edge of the brace 18 is adjacent to or makes contact with the at least one stop 20 as seen in FIGS. 1, 4, and 8. The user 32 then ensures that the second adhering means 30 is in contact or has otherwise coupled with the corresponding first adhering means 28 disposed on the base 12 by pressing the brace 18 against the base 12 or otherwise joining the brace 18 and base 12 together. With the brace 18 correctly placed on the base 12 and adjacent to the stop 20, the brace 18 will be parallel to the base 12, while the vertical portion 16 will be vertical or perpendicular to the base 12 as seen in FIG. 1. Additionally, after the brace 18 has been coupled to the base 12, the incline 14 is disposed at an angle of preferably 45-60° relative the base 12, however the incline 14 may be held at other angles not explicitly disclosed without departing from the original spirit and scope of the invention.

Figure 10:
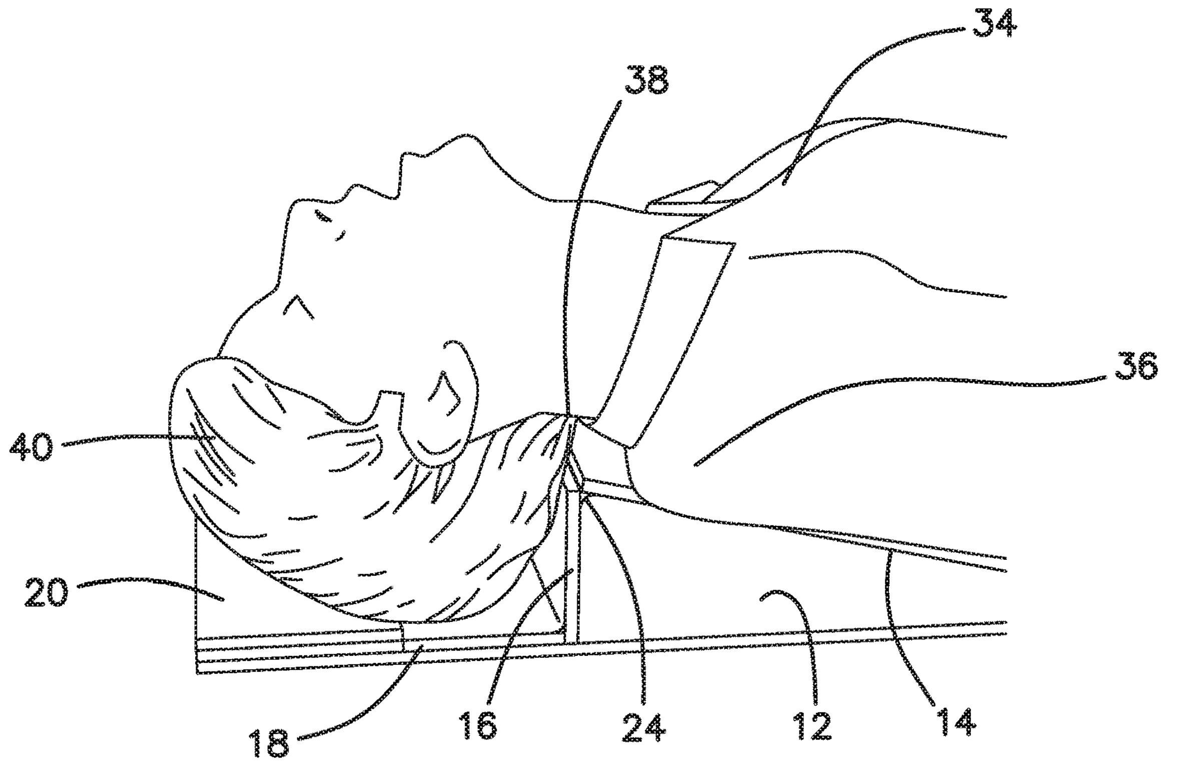
FIG. 10 is a side view of a patient using the airway bridge seen in FIG. 1.
Figure 11:
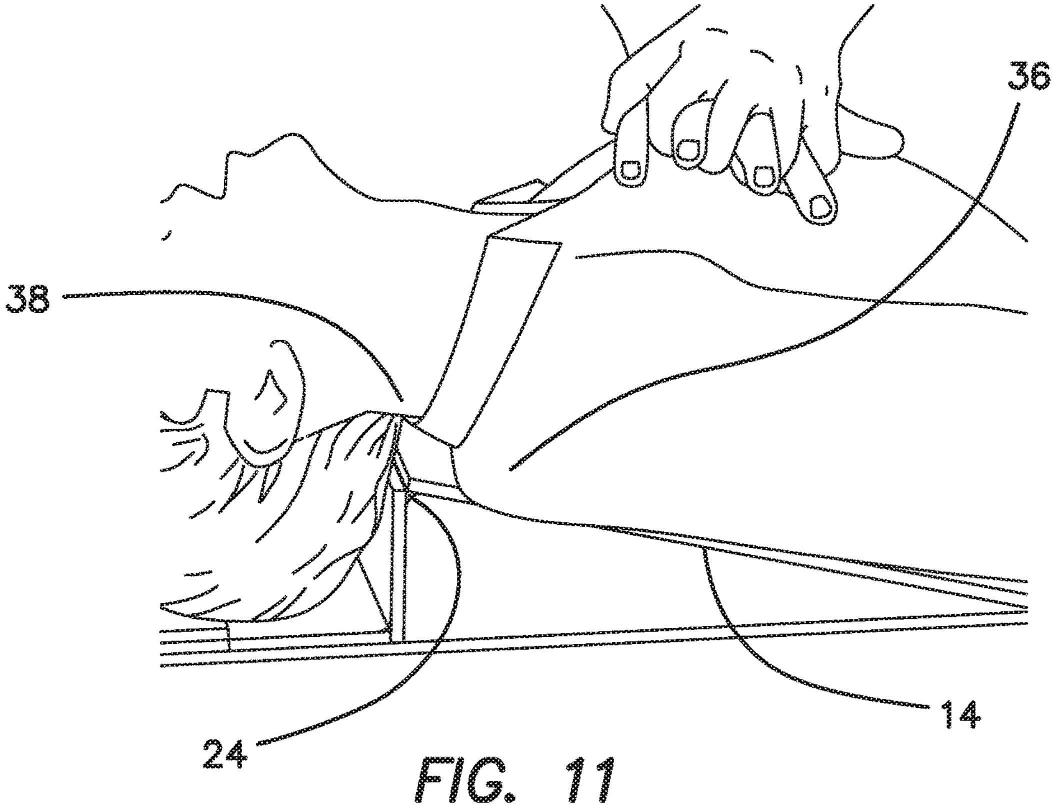
FIG. 11 is a side view of a patient using the airway bridge while CPR is being performed on the patient.

With the brace 18 correctly placed, the airway bridge 10 is ready for use by a patient 34. In one embodiment, the patient 34 is laid down on top of the airway bridge 10 as seen in FIG. 10 with the top portion of their shoulders 36 on the incline 16 and the base of their neck 38 at the second joint 24. The patient's head 40 is then allowed to rest on the remaining portions of the airway bridge 10, namely the top surface of the brace 18 and stop 20. Having the patient's head 40 rest at a lower position than their shoulders 36 inherently angles the patient's head 40 upwards and naturally opens up the patient's oral cavity and thus makes the patient's oral airway easier to access. Additionally, because the patient's head 40 is tilted backwards, the tongue of the patient tends to stay out of the patient's airway thus lowering the probability of the patient's airway becoming occluded. In another embodiment, the patient 34 may be laying on a flat surface beforehand and the assembled airway bridge 10 as seen in FIG. 1 may be slid or forced underneath the patient 34. After the patient has been disposed or placed on top of the airway bridge 10, the user or EMT may perform CPR as seen in FIG. 11 with enhanced access to the patient's oral airway. When in use, the combined weight of the patient and the force from the chest compressions performed by the EMT pushes the brace 18 against the stop 20, thus preventing the brace 18 from sliding laterally and collapsing the airway bridge 10.

After the patient 34 has been treated or moved off of the airway bridge 10, the airway bridge 10 may be collapsed and/or folded by releasing the second adhering means 30 from the first adhering means 28 and lifting the brace 18 upwards away from the base 12. The brace and incline 14 may be manipulated about the first, second, and third joints 22, 24, 26 by the user 32 so that the incline 14, vertical portion 16, and brace 18 are then laid flat or parallel against the stop 20 and base 12 as seen in FIGS. 2 and 3. At this point the airway bridge 10 may be returned to its storage container or simply disposed of by the user.

In an alternative embodiment, the airway bridge 10 comprises a pull tab or other means for actuation which quickly moves the airway bridge 10 from the compact configuration seen in FIG. 2 to the actuated configuration seen in FIG. 1. After placing the airway bridge 10 on a flat surface, the user 32 pulls the pull tab or otherwise activates the actuation means which quickly and automatically brings or pulls the incline 14 to an angled position relative to the base 12 and simultaneously brings the brace 18 to a position adjacent to the stop 20 as seen in FIG. 1. To release or collapse the airway bridge 10 after use, the user 32 may decouple the first and second adhering means 28, 30 from each other as discussed above, or alternatively, the user 32 may actuate a pull tab to collapse the airway bridge 10, either the same pull tab which originally activated the airway bridge 10 or a separate pull tab which is configured for that purpose.

An alternative embodiment of the airway bridge is seen in FIGS. 12-19 and is noted generally with reference numeral 50. The airway bridge 50 comprises a base 52 with a head rest 58 coupled to an upward facing surface of the base 52. Coupled to one lateral edge of the head rest 58 via a first joint 60 is a first vertical portion 56 followed by a first incline portion 54 which is itself coupled to the first vertical portion 56 through a second joint 62. The head rest 58 is permanently coupled to the base 52 and remains in a stationary position, however the first vertical portion 56 and the first incline portion 54 are free to move relative to the base 52 as is described in further detail below. Also coupled to the base 52 at a third joint 66 is a second incline portion 64. Coupled to the most distal edge of the second incline portion 64 at a fourth joint 68 is a second vertical portion 70. The surface elements of the airway bridge 50, namely the base 12, the first and second inclines 54, 64, the first and second vertical portions 56, 70, and the head rest 58 are preferably comprised of a substantially rigid yet lightweight material such as plastic, cardboard, aluminum, or wood, however other similar materials now known or later devised may be used without departing from the original spirit and scope of the invention. The joints 60, 62, 66, 68 in turn are preferably comprised of a flexible yet durable material such as nylon, leather, plastic composites, or other similar materials. In one preferred embodiment, the joints 60, 62, 66, 68 are bendable or foldable portions of the material comprising the components of the airway bridge 50 itself.

Figure 12:
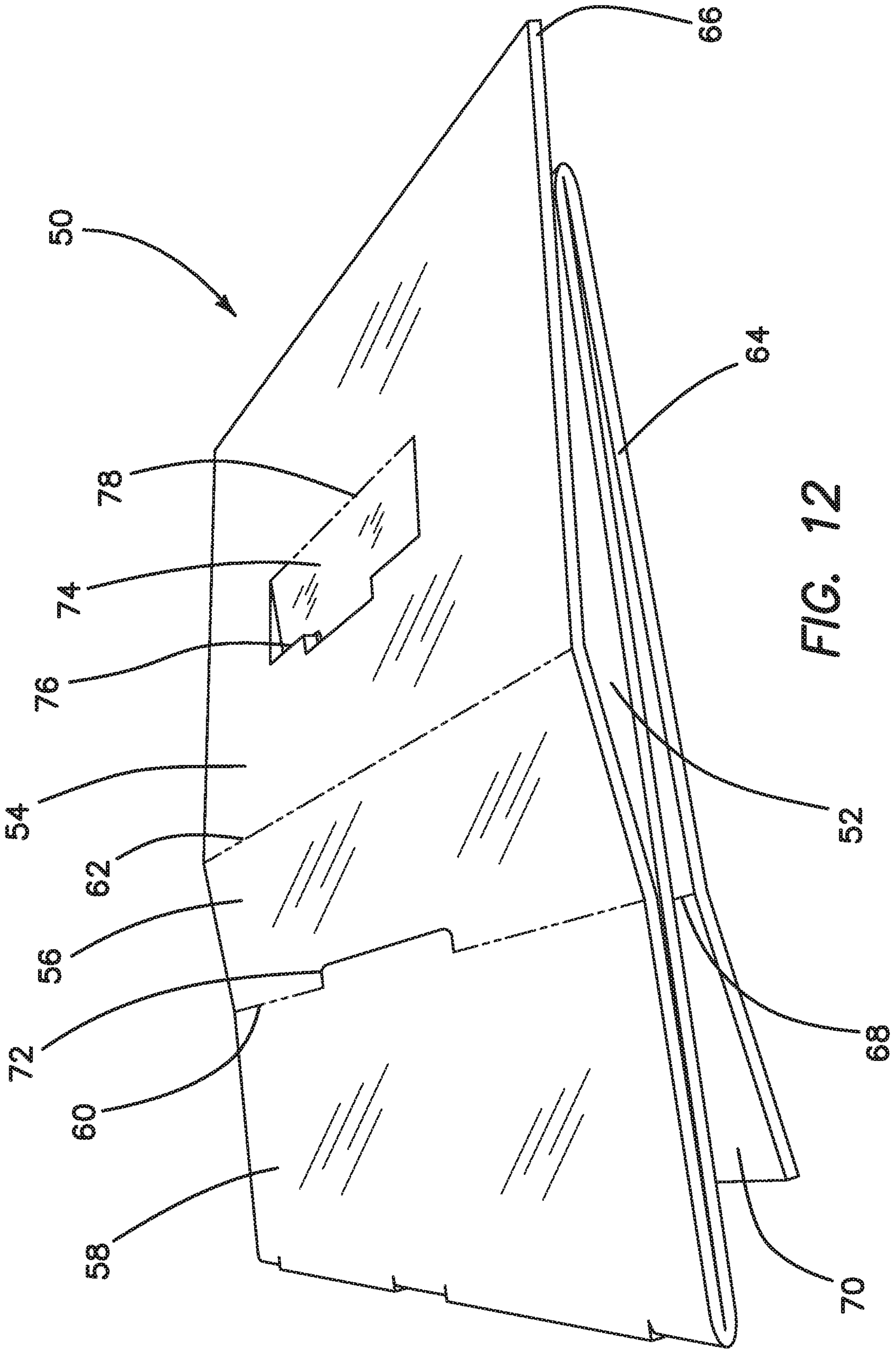
FIG. 12 is a perspective view of an alternative embodiment of the airway bridge comprising an alternate configuration and a finger aperture with a support.

As also seen in FIG. 12, the first vertical portion 56 comprises a substantially rectangular shaped tab aperture 72 defined through its surface. The first incline portion 54 in turn comprises a support 74 and a correspondingly shaped definition 76 which accommodates the support 74 within the surface of the first incline portion 54. The support 74 is coupled to the surface of the first incline portion 54 through a hinge 78 which allows the support 74 to rotate with respect to the surface of the first incline portion 54.

In FIG. 12, the airway bridge 50 is seen in a collapsed or storage configuration wherein the airway bridge 50 is substantially flat and/or rectangular in shape that is ideal for storage or mobile transport. As seen in FIG. 12, the first and second incline portions 54, 64 and the first and second vertical portions 56, 70 are laid flat against the base 52 and head rest 58 by bending the first joint 60 a maximum amount so that the first incline portion 54, and the first vertical portion 56 rest flat against the upward facing base 52. Conversely, the third joint 66 is bent to a minimum amount so that the second incline portion 64 and the second vertical portion 70 rest flat against the underside of the base 52. With the airway bridge 50 in this configuration, the airway bridge 50 has a minimum thickness which allows a plurality of airway bridges 50 to be stacked on one another or placed into a medical equipment bag or storage case while still maintaining a minimum volume.

Figure 13:
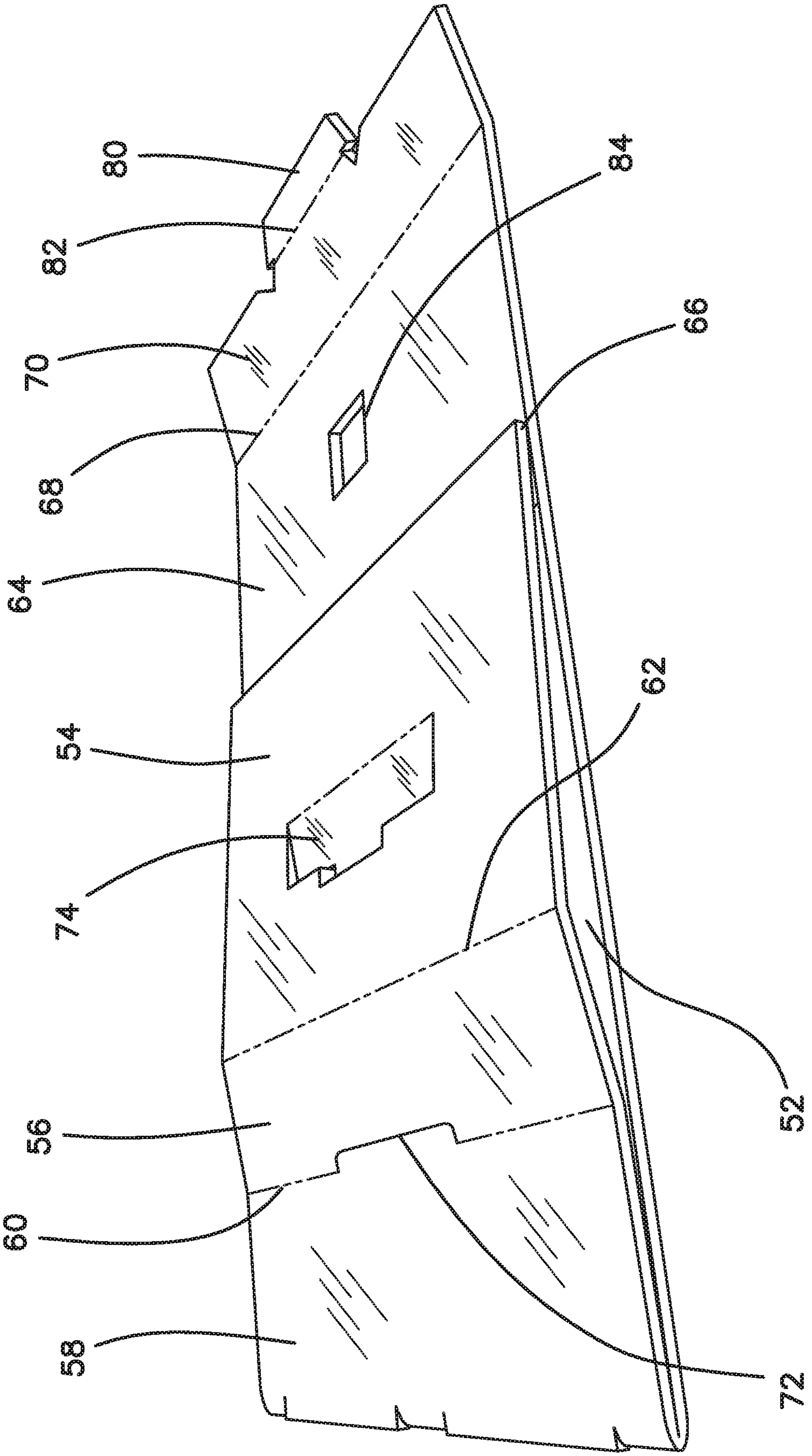
FIG. 13 is a perspective view of the airway bridge seen in FIG. 12 where an outer incline portion has been unfolded and laid out on a common plane with a base of the airway bridge.

In FIG. 13, the airway bridge 50 is seen in an unfolded or expanded configuration wherein the airway bridge 50 is substantially flat but in an elongated or extended shape as compared to the shape seen in FIG. 12. As seen in FIG. 13, the airway bridge 50 is principally a single structural body or component divided by a plurality of joints or flexible portions there between. The third joint 66 is bent to a maximum so that the second incline portion 64 and the second vertical portion 70 extend outward on the same plane as the base 52. Also seen in FIG. 13 is a tab 80 coupled to the second vertical portion 70 via a hinge 82. The hinge 82 allows the tab to be manipulated and adjusted relative to the orientation of the second vertical portion 70. FIG. 13 also shows a finger aperture 84 defined through the outer incline portion 64. The finger aperture 84 is substantially square shaped, however other shapes or configurations may be used without departing from the original spirit and scope of the invention. The finger aperture 84 is large enough to accommodate at least one finger of a user and is configured to allow the user to physically access the various other components of the airway bridge 50 as will be detailed further below.

Figure 14:
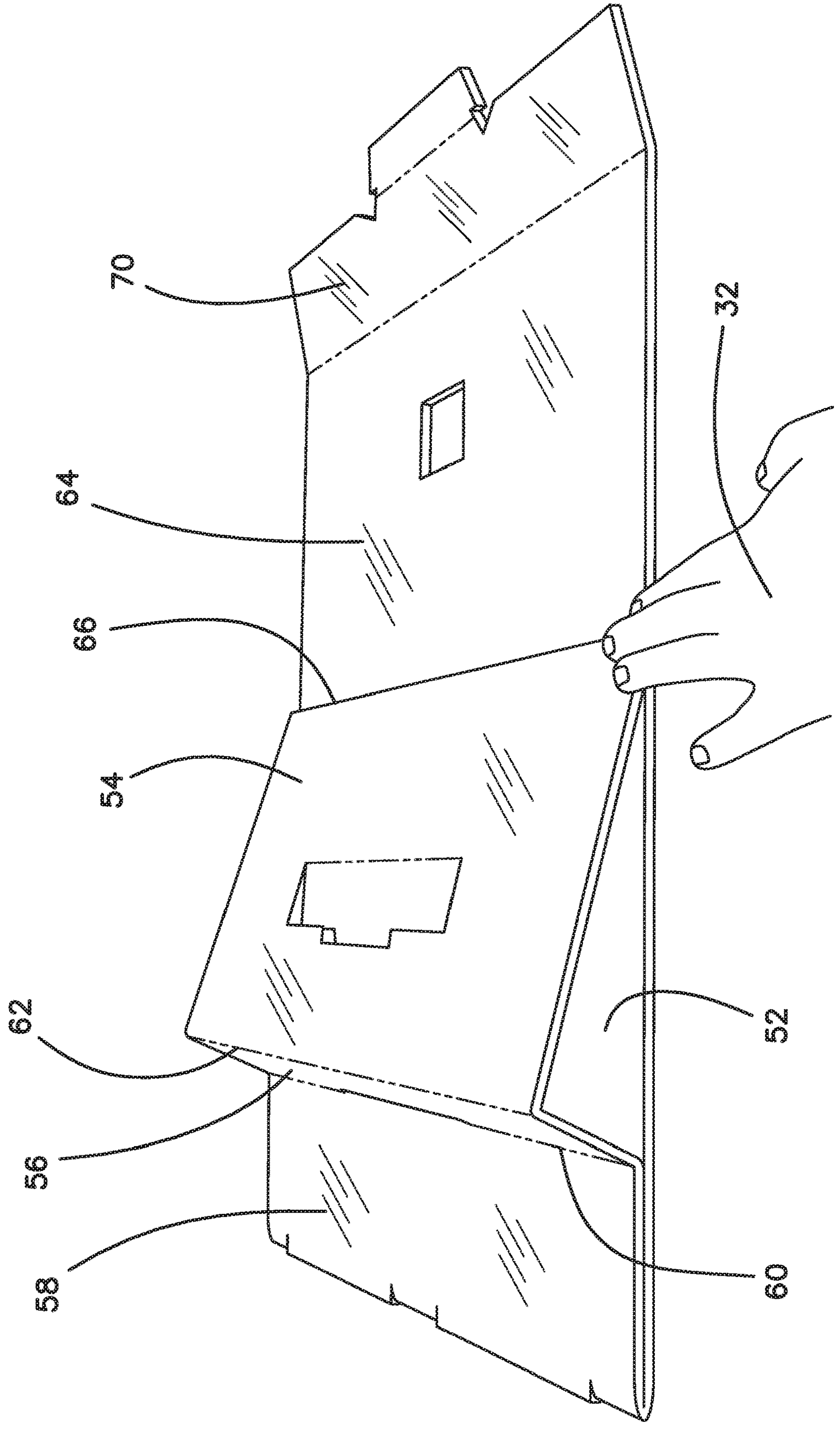
FIG. 14 is an elevated side view of the airway bridge seen in FIG. 13 after an inner incline portion has been placed into its operating configuration.
Figure 15:
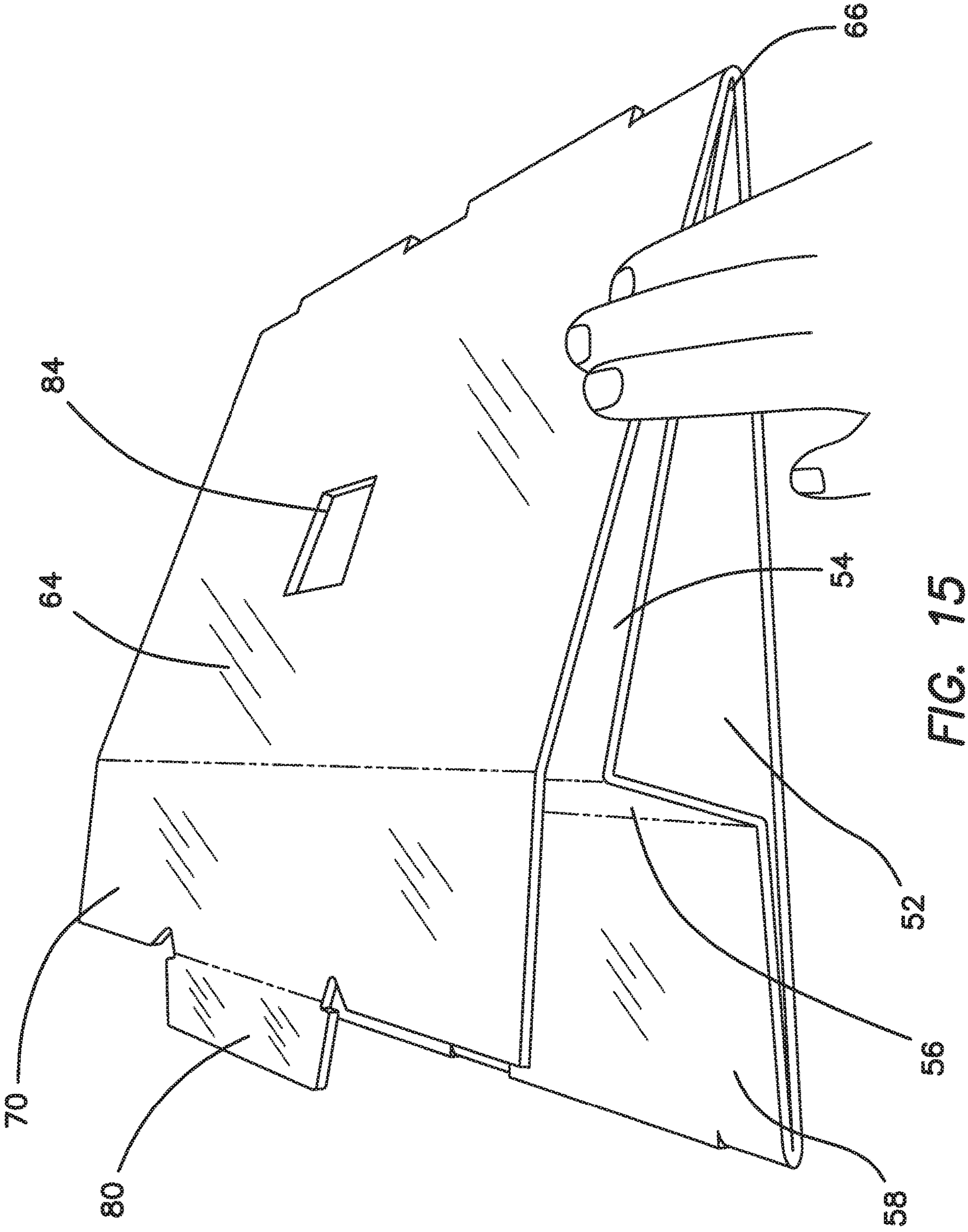
FIG. 15 is an elevated side view of the airway bridge seen in FIG. 14 after the outer incline portion has been placed over the inner incline portion.
Figure 16:
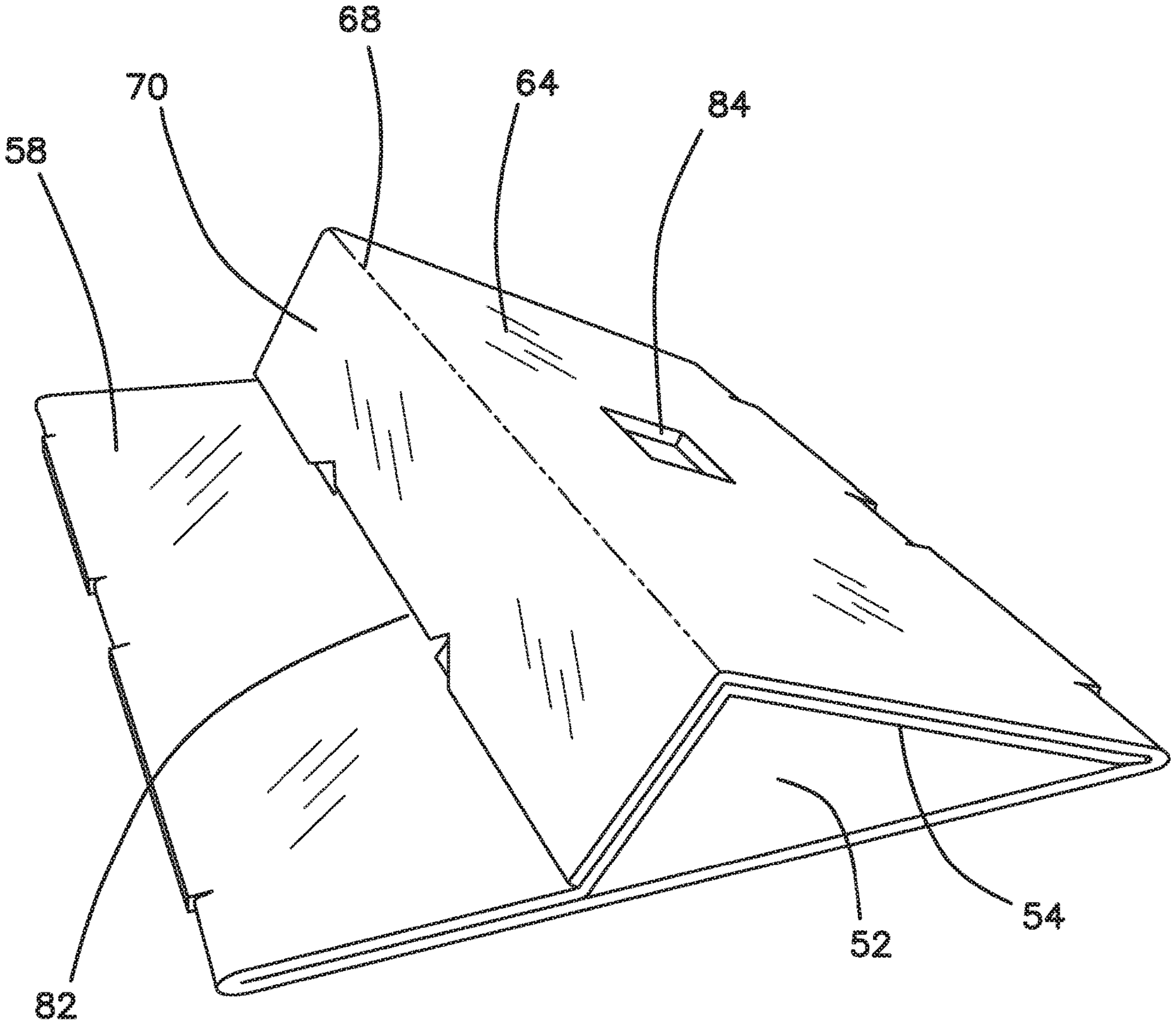
FIG. 16 is a perspective view of the airway bridge seen in FIG. 15 after the outer incline portion and an outer vertical portion have been locked into position after a tab has been inserted into a tab aperture 72 of the airway bridge.
Figure 17:
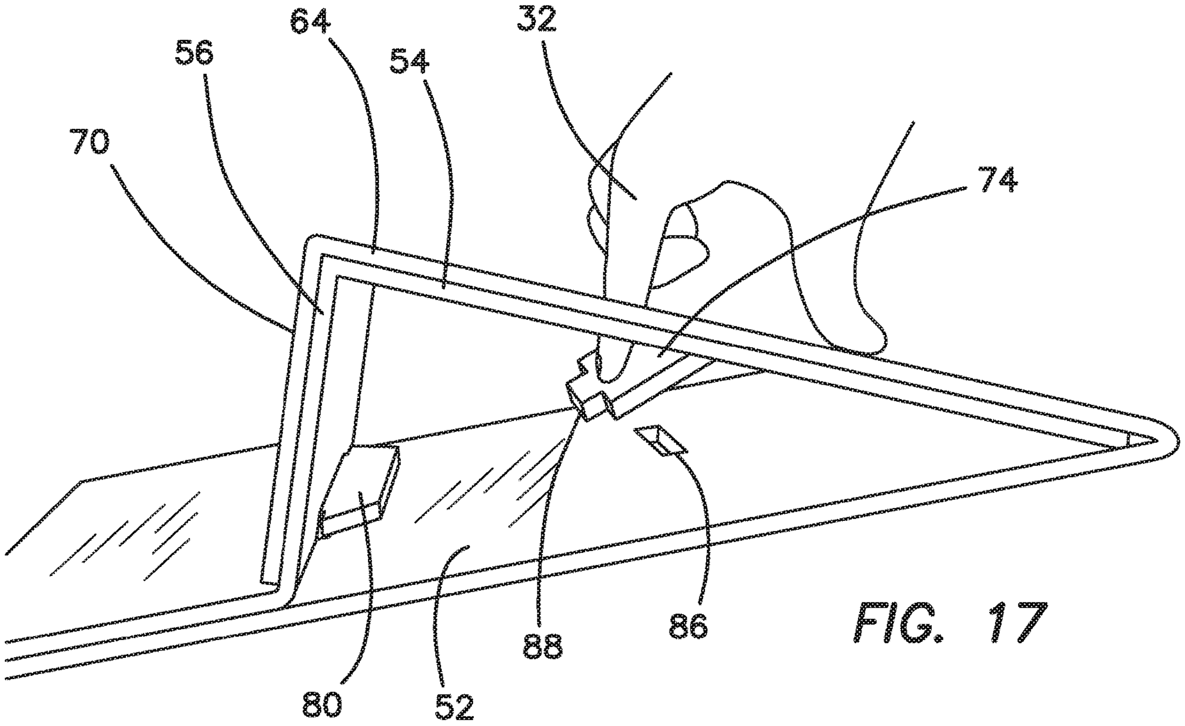
FIG. 17 is a side view of the airway bridge seen in FIG. 16 as the support is being actuated in order to provide further structural support to the airway bridge.
Figure 18:
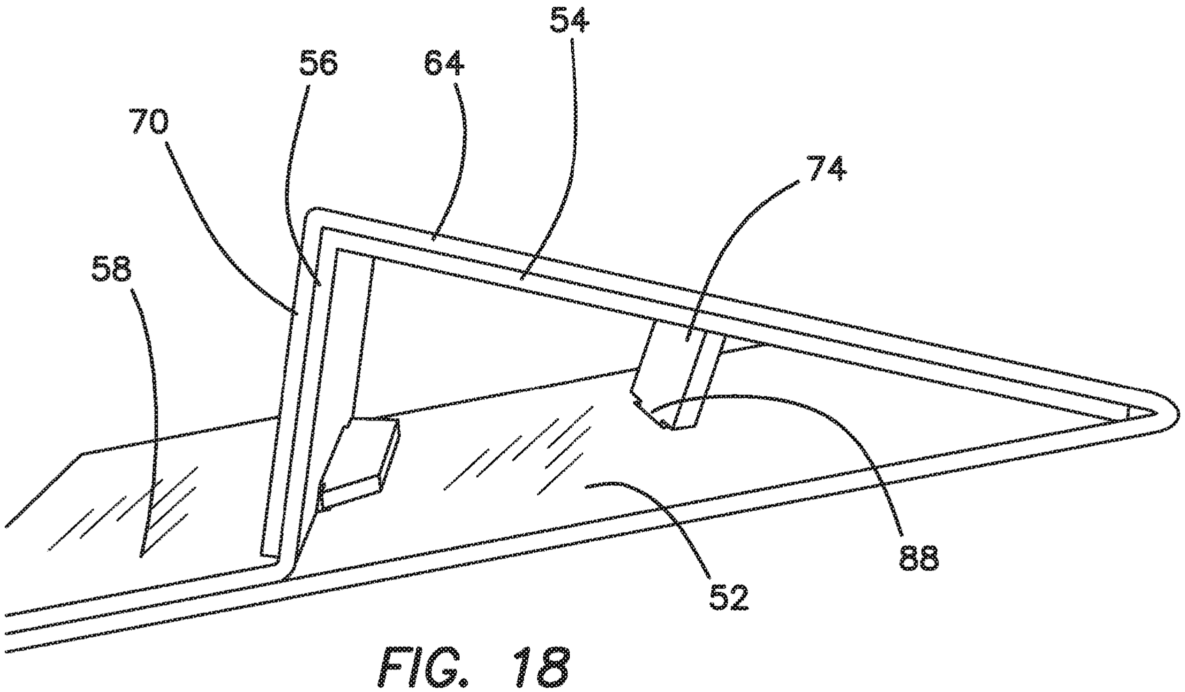
FIG. 18 is a side view of the airway bridge seen in FIG. 17 after the support has been fully actuated into its final operating configuration.

To use the airway bridge 50, a user removes the airway bridge 50 from its storage location while it is in its folded configuration seen in FIG. 12. The user 32 then places the airway bridge 50 on a flat surface with the second incline portion 64 extended outward from the base 52 as seen in FIG. 14. Next the user 32 angles the first incline portion 54 by gripping the first incline portion 54 and lifting upwards, bending the airway bridge 50 at the first joint 60 and the second joint 62. The user 32, while holding the first incline portion 54 in place then folds the second incline portion 64 about the third joint 66 so that the second incline portion 64 is placed over the upward facing surface of the first incline portion 54 as seen in FIG. 15. Placing the second incline portion 64 over the first incline portion 54 not only reinforces the overall strength of the inclined portion of the airway bridge 50, but also aligns the finger aperture 84 directly over the support 74 defined within the first incline portion 54. The user 32 then bends the second vertical portion 70 about the fourth joint 68 so as to bring the second vertical portion 70 down against the first vertical portion 56. The tab 80 is then guided into the tab aperture 72 by bending the tab 80 about the hinge 82 and pushing the tab 80 into the tab aperture 72, thus locking the second vertical portion 70 and the second incline portion 64 into place as seen in FIG. 16. Turning to FIG. 17, with the second vertical and incline portions 70, 64 correctly placed, the user 32 then inserts their finger into the finger aperture 84 and presses downward on the support 74, thereby rotating it downward about the hinge 78. The support 74 is rotated downward until a distal edge 88 of the support 74 makes contact with and then is inserted into a slot 86 defined within the upward facing surface of the base 52. Because the distal edge 88 of the support 74 is raised or protruding relative to the main portion of the support 74, the distal edge 88 effectively "pops" or jumps into the slot 86 as the support 74 is being rotated toward the base 52. Additionally, after the support 74 has been inserted into the base 52 as seen in FIG. 18, the first and second incline portions 54, 64 are disposed at an angle of preferably 45-60° relative the base 52, however the first and second incline portions 54, 64 may be held at other angles not explicitly disclosed without departing from the original spirit and scope of the invention.

Figure 19:
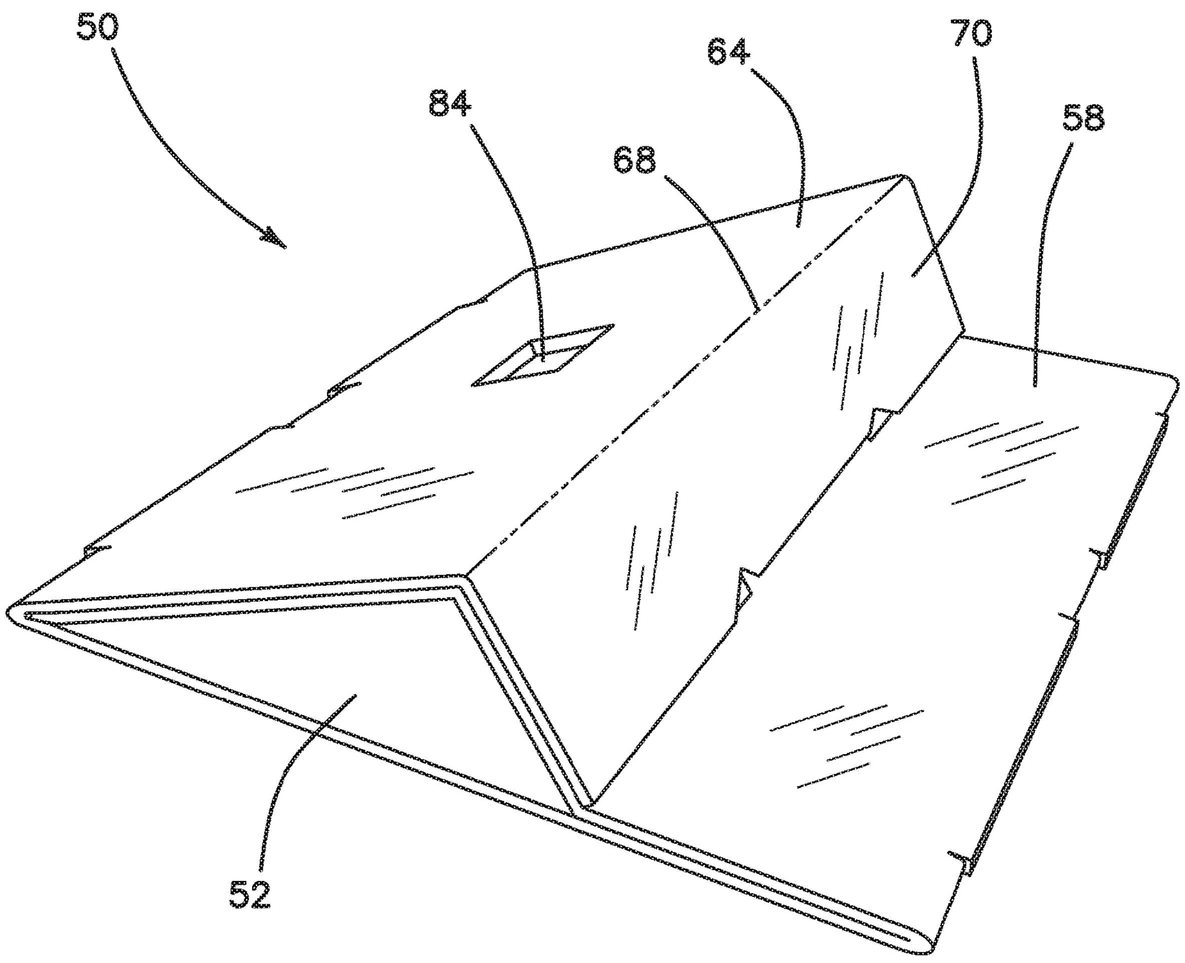
FIG. 19 is a perspective view of the airway bridge seen in FIGS. 12-18 after the airway bridge has been fully constructed.

Turning to FIG. 19, after the airway bridge 50 has been fully constructed, the airway bridge 50 is then ready for use by a patient in the same manner as is described above. Specifically, the patient is laid down on top of the airway bridge 50 with the top portion of their shoulders on the outer incline portion 64 and the base of their neck at the fourth joint 68. The patient's head is then allowed to rest on the remaining portions of the airway bridge 50, namely the top surface of the head rest 58. Having the patient's head rest at a lower position than their shoulders automatically angles the patient's head upwards and naturally opens up the patient's oral cavity and thus makes the patient's oral airway easier to access. Additionally, because the patient's head is tilted backwards, the tongue of the patient tends to stay out of the patient's airway thus lowering the probability of the patient's airway becoming occluded. In another embodiment, the patient may be laying on a flat surface beforehand and the assembled airway bridge 50 as seen in FIG. 19 may be slid or forced underneath the patient. After the patient has been disposed or placed on top of the airway bridge 50, the user or EMT may perform CPR similar to what is seen in FIG. 11 with enhanced access to the patient's oral airway.

An alternative embodiment of the airway bridge is seen in FIGS. 20-23 and is noted generally with reference numeral 90. The airway bridge 90 comprises a base 104 with a head rest 92 coupled to an upward facing surface of the base 104. Also coupled to the base 104 at a first joint 102 is a first incline 94. Coupled in turn to the most distal edge of the incline 94 at a second joint 100 is a second incline 96. The head rest 92 is permanently coupled to the base 104 and remains in a stationary position, however the first incline 94 and the second incline 96 are free to move relative to the base 104 as is described in further detail below. The surface elements of the airway bridge 90, namely the base 104, the first and second inclines 94, 96, and the head rest 92 are preferably comprised of a substantially rigid yet lightweight material such as plastic, cardboard, aluminum, or wood, however other similar materials now known or later devised may be used without departing from the original spirit and scope of the invention. The joints 102, 100 in turn are preferably comprised of a flexible yet durable material such as nylon, leather, plastic composites, or other similar materials. In one preferred embodiment, the joints 102, 100 are bendable or foldable portions of the material comprising the components of the airway bridge 90 itself.

Figure 20:
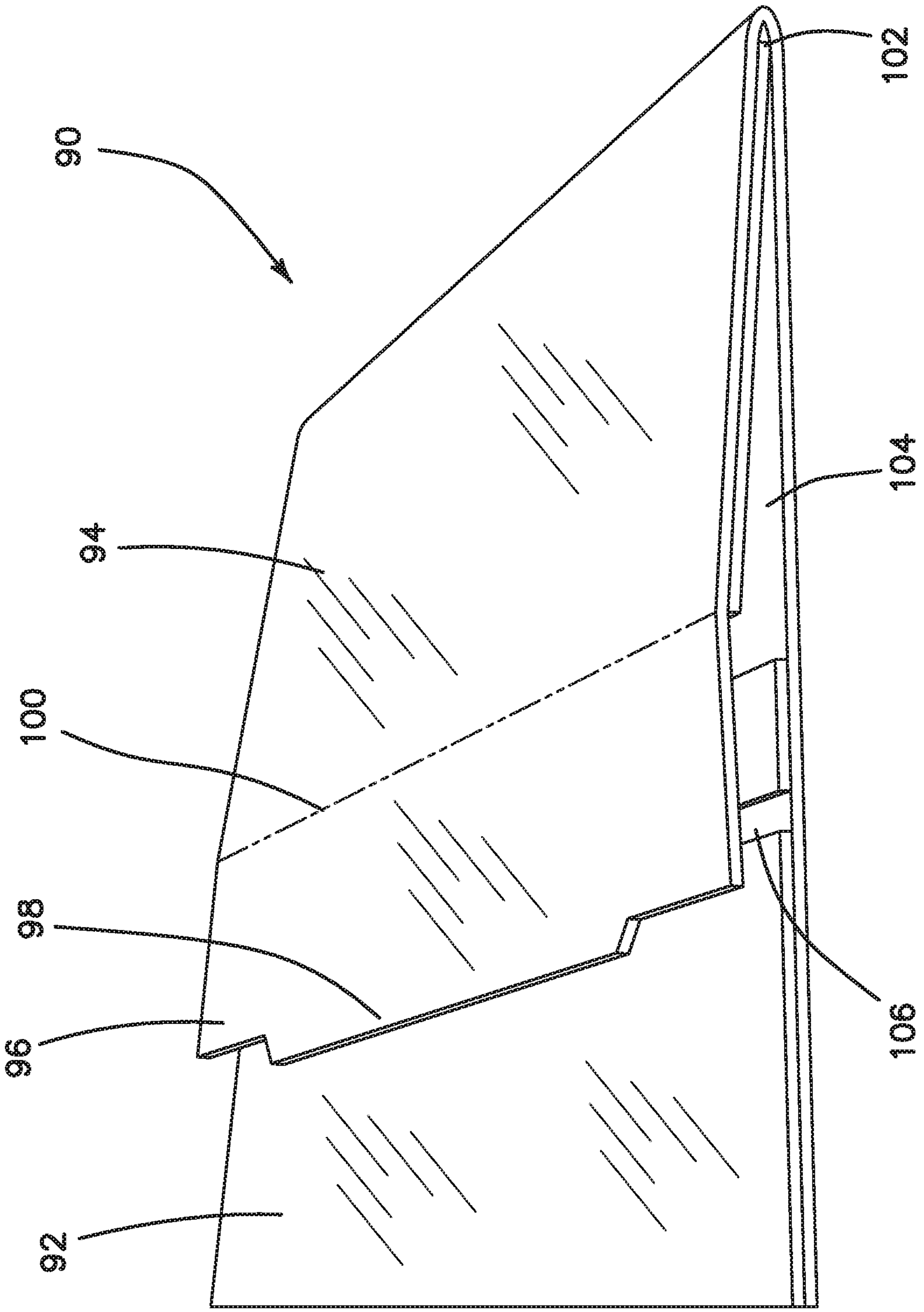
FIG. 20 is a perspective view of an alternative embodiment of the airway bridge comprising a differing configuration and an elongated tab disposed across a distal edge of a second incline portion of the airway bridge.
Figure 21:
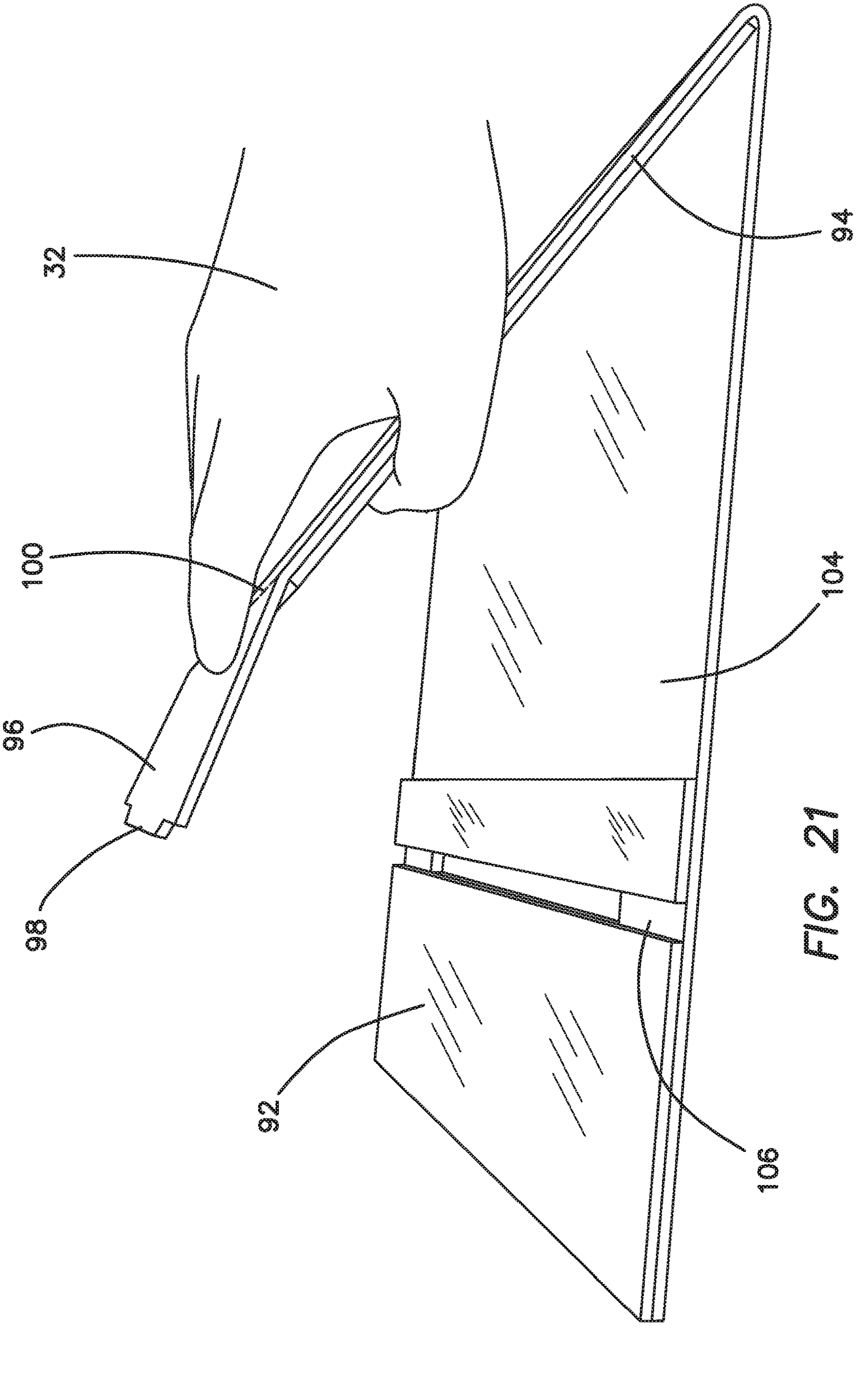
FIG. 21 is a side view of the airway bridge seen in FIG. 20 as a first and second incline portions are being lifted off of the base of the airway bridge.

As also seen in FIG. 20, the second incline 96 comprises a substantially elongated tab 98 disposed on its distal most edge. The head rest 92 in turn comprises a tab aperture 106 defined across its width as best seen in FIG. 21. The tab aperture 106 is defined within the head rest 92 at an asymmetrical or off-center position relative to the head rest 92 itself.

In FIG. 20, the airway bridge 90 is seen in a collapsed or storage configuration wherein the airway bridge 90 is substantially flat and/or rectangular in shape that is ideal for storage or mobile transport. As seen in FIG. 20, the first and second incline portions 94, 96 are laid flat against the base 104 and head rest 92 by bending the first joint 102 a maximum amount so that the first incline portion 94 and the second incline portion 96 rest flat against the upward facing surface of the base 104. With the airway bridge 90 in this configuration, the airway bridge 90 has a minimum thickness which allows a plurality of airway bridges 90 to be stacked on one another or placed into a medical equipment bag or storage case while still maintaining a minimum volume.

Figure 22:
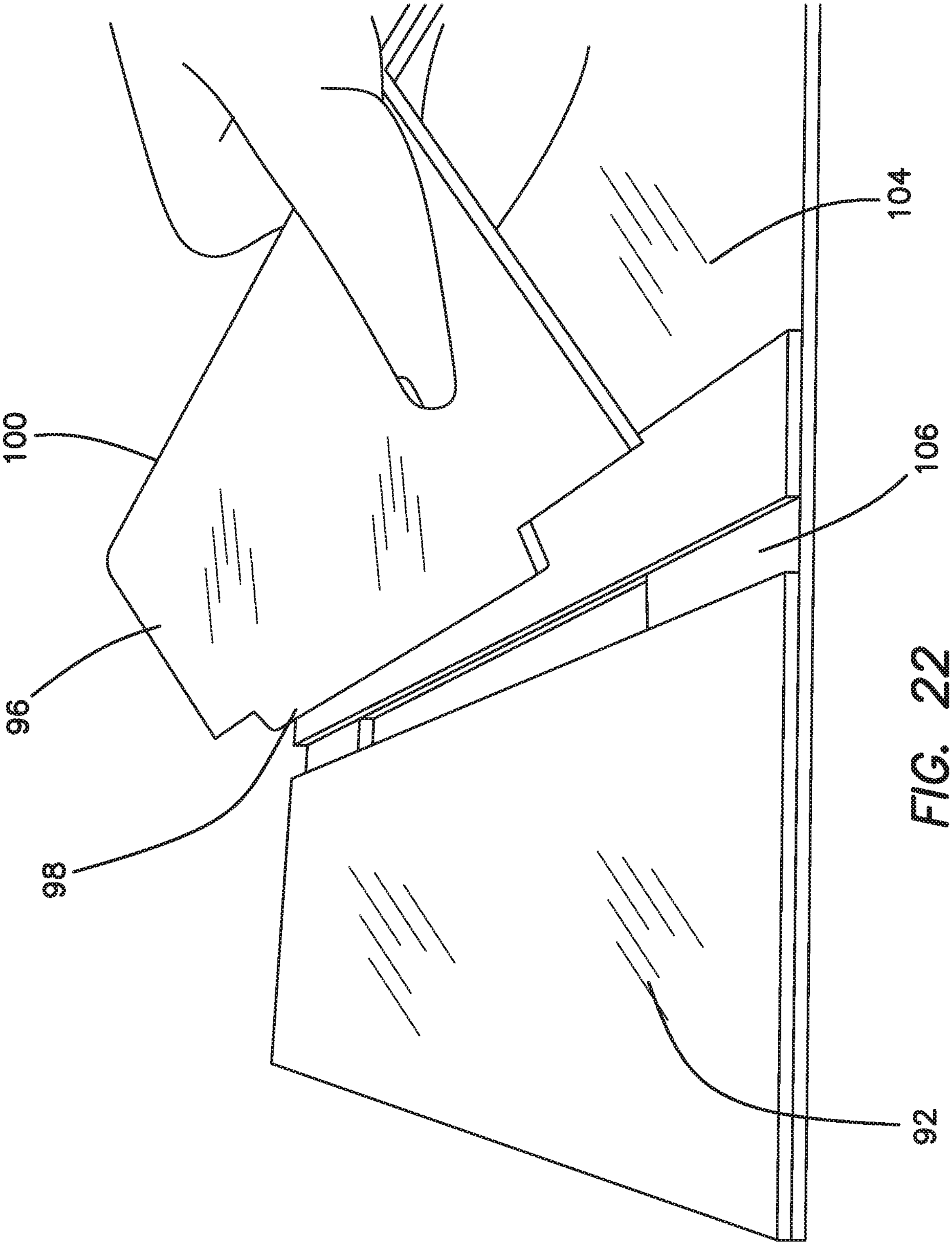
FIG. 22 is a magnified view of the airway bridge seen in FIG. 21 as the tab disposed on the second incline portion is being angled down toward a tab aperture defined within a head rest of the airway bridge.

To use the airway bridge 90, a user removes the airway bridge 90 from its storage location while it is in its folded configuration seen in FIG. 20. The user 32 angles the first incline portion 94 by gripping the first incline portion 94 and lifting upwards, bending the airway bridge 90 at the first joint 102. The user 32, while holding the first incline portion 94 in place then bends the second incline portion 96 about the second joint 100 so that the second incline portion 96 is angled downward toward the tab aperture 106 as seen in FIG. 22. The user 32 continues to bend the second incline portion 96 about the second joint 100 and the first incline portion 94 about the first joint 102 so as to bring the tab 98 down and into the tab aperture 106, thus locking the second incline portion 96 and the first incline portion 94 into place as seen in FIG. 23.

It is to be expressly noted that in a related embodiment, the airway bridge 90 may further comprise a finger aperture, a support, and a slot, similar to what is described above with regard to FIGS. 13-19. Specifically, with the first and second incline portions 94, 96 correctly placed, the user 32 may then insert their finger into the finger aperture and press downward on a support, thereby rotating it downward about a hinge. The support is rotated downward until a distal edge of the support makes contact with and then is inserted into a slot defined within the upward facing surface of the base. Because the distal edge of the support is raised or protruding relative to the main portion of the support, the distal edge effectively "pops" or jumps into the slot as the support is being rotated toward the base. Additionally, after the support has been coupled to the base, the first incline portion 94 is disposed at an angle of preferably 45-60° relative the base 104, however the first incline portion 94 may be held at other angles not explicitly disclosed without departing from the original spirit and scope of the invention.

Figure 23:
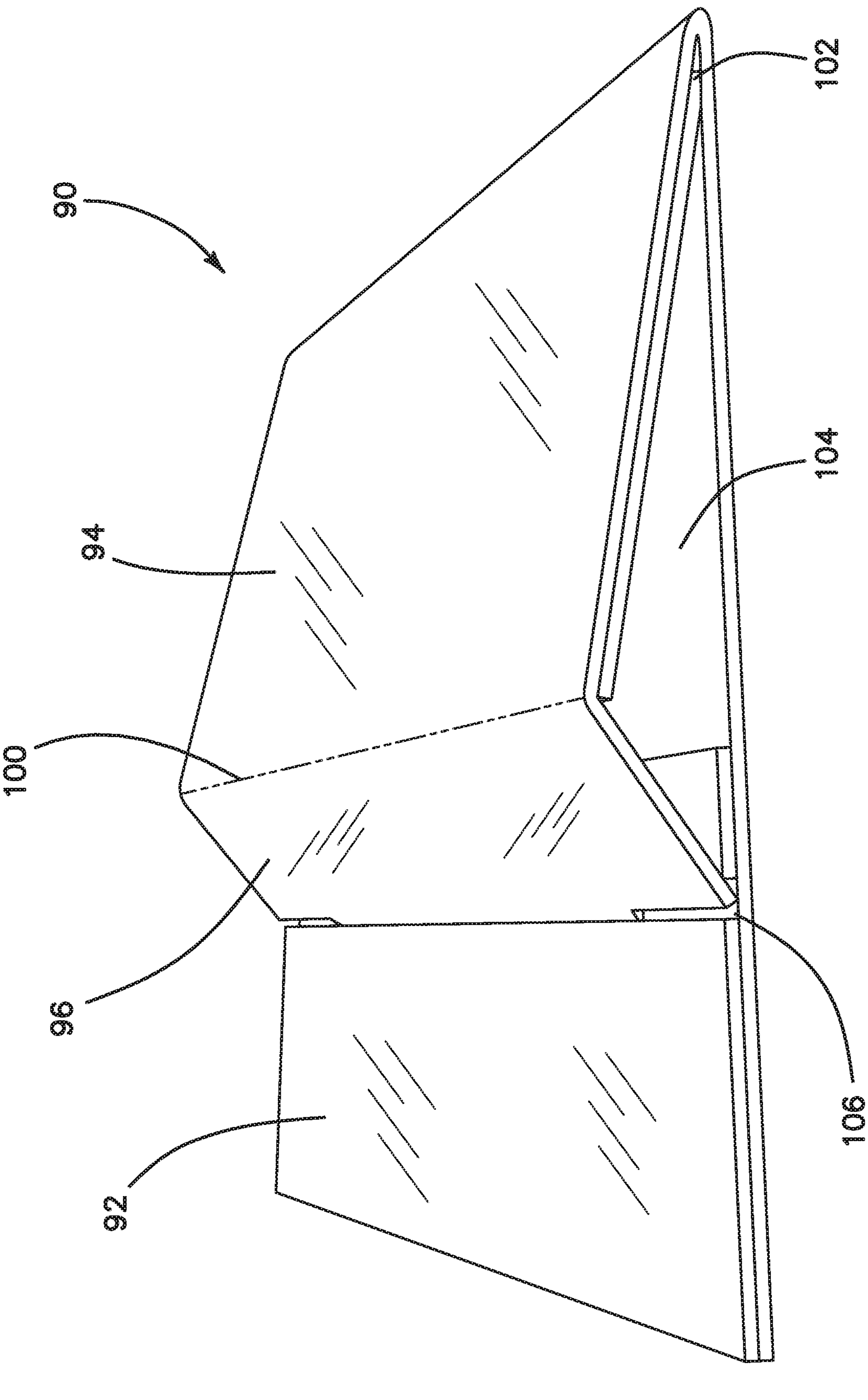
FIG. 23 is a perspective view of the airway bridge seen in FIG. 22 after the tab has been inserted into the tab aperture defined within the head rest.

Turning to FIG. 23, after the airway bridge 90 has been fully constructed, the airway bridge 90 is then ready for use by a patient in the same manner as is described above. Specifically, the patient is laid down on top of the airway bridge 90 with the top portion of their shoulders on the first incline portion 94 and the base of their neck at the second joint 100. The patient's head is then allowed to rest on the remaining portions of the airway bridge 90, namely the top surface of the head rest 92. Having the patient's head rest at a lower position than their shoulders automatically angles the patient's head upwards and naturally opens up the patient's oral cavity and thus makes the patient's oral airway easier to access. Additionally, because the patient's head is tilted backwards, the tongue of the patient tends to stay out of the patient's airway thus lowering the probability of the patient's airway becoming occluded. In another embodiment, the patient may be laying on a flat surface beforehand and the assembled airway bridge 90 as seen in FIG. 23 may be slid or forced underneath the patient. After the patient has been disposed or placed on top of the airway bridge 90, the user or EMT may perform CPR similar to what is seen in FIG. 11 with enhanced access to the patient's oral airway.

Figure 24:
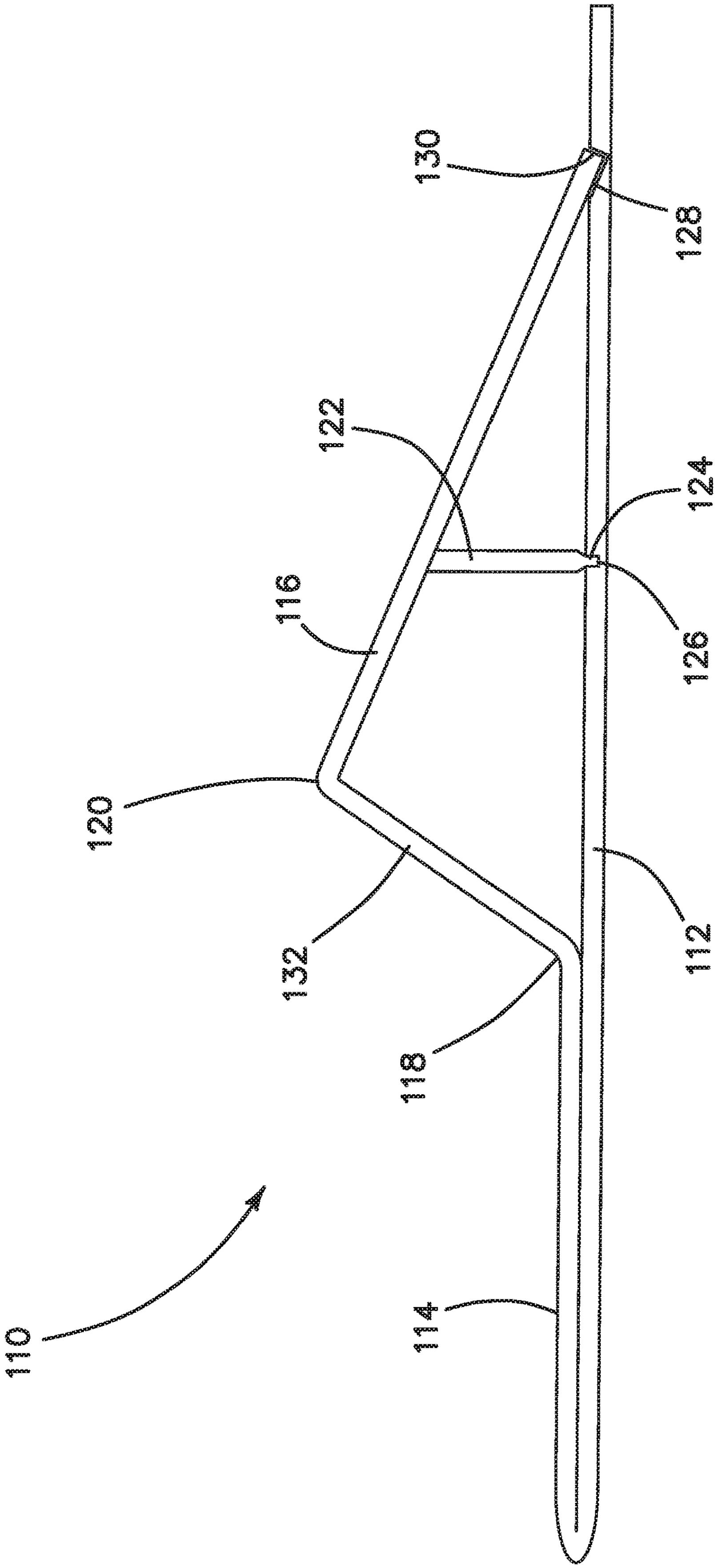
FIG. 24 is a cross sectional diagram of an alternative embodiment of the airway bridge where the incline portion of the airway bridge is inserted into a corresponding incline aperture defined within the base.

Yet another embodiment of the airway bridge is seen in FIG. 24 and is noted generally with reference numeral 110. The airway bridge 110 comprises a base 112 with a head rest 114 coupled to an upward facing surface of the base 112. Also coupled to the head rest 114 at a first joint 118 is a vertical portion 132. Coupled in turn to the opposing edge of the vertical portion 132 at a second joint 120 is an incline 116. The head rest 114 is permanently coupled to the base 112 and remains in a stationary position, however the incline 116 and the vertical portion 132 are free to move relative to the base 112 as is described in further detail below. The surface elements of the airway bridge 110, namely the base 112, the inclines 116, and the head rest 114 are preferably comprised of a substantially rigid yet lightweight material such as plastic, cardboard, aluminum, or wood, however other similar materials now known or later devised may be used without departing from the original spirit and scope of the invention. The joints 118, 120 in turn are preferably comprised of a flexible yet durable material such as nylon, leather, plastic composites, or other similar materials. In one preferred embodiment, the joints 118, 120 are bendable or foldable portions of the material comprising the components of the airway bridge 110 itself.

As also seen in FIG. 24, the incline 116 comprises a support 122 coupled to a bottom surface of the incline 116. The support 122 in turn comprises a tapered tip 124 disposed at its most distal edge. The base 112 further comprises a support aperture 126 and an incline aperture 128 defined in its upward facing surface. The support aperture 126 is sufficiently sized and shaped to accommodate the tapered tip 124 of the support 122 as seen in FIG. 24 while the incline aperture 128 is an angled cutout or definition within a distal end of the base 112. The incline aperture 128 is defined across the width of the base 112 is sufficiently sized to accommodate a distal end 130 of the incline 116 as is further detailed below.

To use the airway bridge 110, a user removes the airway bridge 110 from its storage location while it is in a folded configuration. The user 32 angles the incline 116 by gripping the incline portion 116 and lifting upwards, bending the airway bridge 110 at the first joint 118 and the second joint 120. The user 32 continues to manipulate the incline 116 about the joints 118, 120 so as to put the vertical portion 132 in a substantially vertical position while bringing the distal edge 130 of the incline 116 down and into the incline aperture 128, thus locking the incline 116 and the vertical portion 132 into place as seen in FIG. 24.

It is to be expressly noted that in a related embodiment, the airway bridge 110 may further comprise a finger aperture similar to what is described above with regard to FIGS. 13-19. Specifically, with the incline 116 correctly inserted into the incline aperture 128, the user 32 may then insert their finger into the finger aperture and press downward on the support 122, thereby rotating it downward about a hinge. Conversely, the user 32 may simply reach underneath the incline 116 and grab and rotate the support 122 directly. The support 122 is rotated downward until the tapered tip 124 of the support 122 makes contact with and then is inserted into the support aperture 126 within the upward facing surface of the base 112. Because the tapered tip 124 of the support 122 extends or protrudes outward relative to the main portion of the support 122, the tapered tip 124 effectively "pops" or jumps into the support aperture 126 as the support 122 is brought toward the base 112. Additionally, after the support 122 has been inserted into the base 112, the incline 16 is disposed at an angle of preferably 45-60° relative the base 112, however the incline 116 may be held at other angles not explicitly disclosed without departing from the original spirit and scope of the invention.

After the airway bridge 110 has been fully constructed, the airway bridge 110 is then ready for use by a patient in the same manner as is described above. Specifically, the patient is laid down on top of the airway bridge 110 with the top portion of their shoulders on the incline 116 and the base of their neck at the second joint 120. The patient's head is then allowed to rest on the remaining portions of the airway bridge 110, namely the top surface of the head rest 114. Having the patient's head rest at a lower position than their shoulders automatically angles the patient's head upwards and naturally opens up the patient's oral cavity and thus makes the patient's oral airway easier to access. Additionally, because the patient's head is tilted backwards, the tongue of the patient tends to stay out of the patient's airway thus lowering the probability of the patient's airway becoming occluded. In another embodiment, the patient may be laying on a flat surface beforehand and the assembled airway bridge 110 as seen in FIG. 24 may be slid or forced underneath the patient. After the patient has been disposed or placed on top of the airway bridge 110, the user or EMT may perform CPR similar to what is seen in FIG. 11 with enhanced access to the patient's oral airway.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An airway bridge for maintaining a patient at an elevated position comprising:

a base;

a head rest coupled to the base;

an adjustable first vertical portion coupled to the head rest;

an adjustable first incline portion coupled to the adjustable first vertical portion;

an adjustable support disposed on the adjustable first incline portion;

a slot defined within an upward facing surface of the airway bridge;

an adjustable second incline portion coupled to the base;

an adjustable second vertical portion coupled to the adjustable second incline portion; and a tab disposed on a lateral edge of the adjustable second vertical portion, wherein the adjustable support is configured to be selectively engaged with the slot defined within the upward facing surface of the airway bridge.

2. The airway bridge of claim 1 wherein the adjustable support comprises a tapered tip and wherein the slot defined within the upward facing surface of the airway bridge is configured to accommodate the tapered tip of the adjustable support.

3. The airway bridge of claim 1 wherein the adjustable support is defined within the adjustable first incline portion and wherein the adjustable second incline portion comprises a finger aperture defined through its surface.

4. The airway bridge of claim 1 wherein the adjustable first vertical portion comprises a tab aperture configured to accommodate the tab disposed on the lateral edge of the adjustable second vertical portion.

5. The airway bridge of claim 1 wherein the slot defined within the upward facing surface of the airway bridge is defined within an upward facing surface of the base.

6. The airway bridge of claim 1 further comprising an incline aperture defined within the base, wherein the incline aperture is configured to accommodate a distal end of the adjustable first incline portion.

7. An airway bridge for maintaining a patient at an elevated position comprising:

a base;

a head rest coupled to the base;

an adjustable incline portion coupled to the base;

an adjustable vertical portion coupled to the adjustable incline portion;

a tab aperture defined within a surface of the head rest; and a tab disposed on a lateral edge of the adjustable vertical portion, wherein the tab aperture is configured to accommodate the tab disposed on the lateral edge of the adjustable vertical portion.

* * * * *